L. J. HALL.
MACHINE FOR SEALING AND STAMPING MAIL MATTER.
APPLICATION FILED FEB. 11, 1910.

1,173,263.

Patented Feb. 29, 1916.
17 SHEETS—SHEET 1.

WITNESSES:

INVENTOR
Louis J. Hall
BY
Davis & Davis
his ATTORNEYS

L. J. HALL.
MACHINE FOR SEALING AND STAMPING MAIL MATTER.
APPLICATION FILED FEB. 11, 1910.

1,173,263.

Patented Feb. 29, 1916.
17 SHEETS—SHEET 2.

WITNESSES:

INVENTOR
Louis J. Hall
BY
his ATTORNEYS

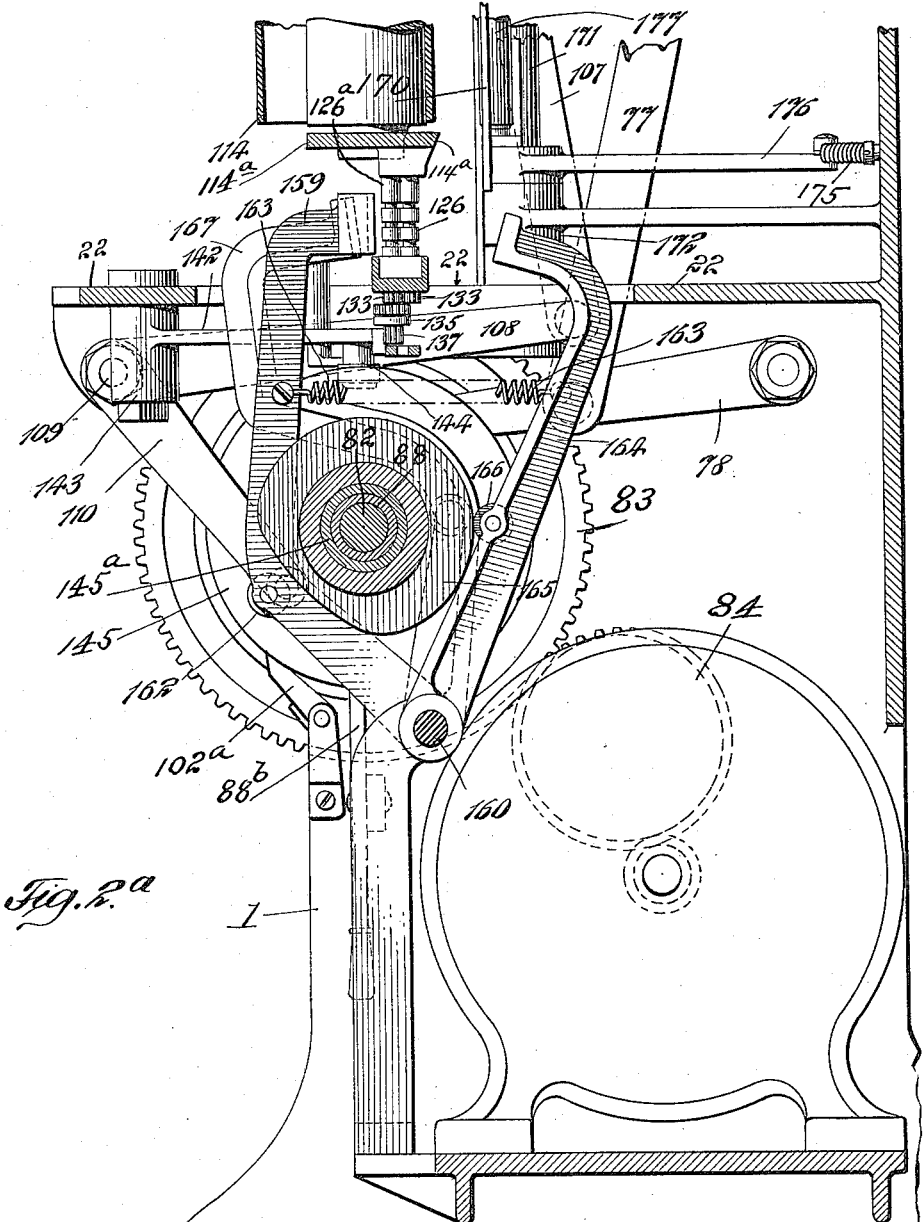

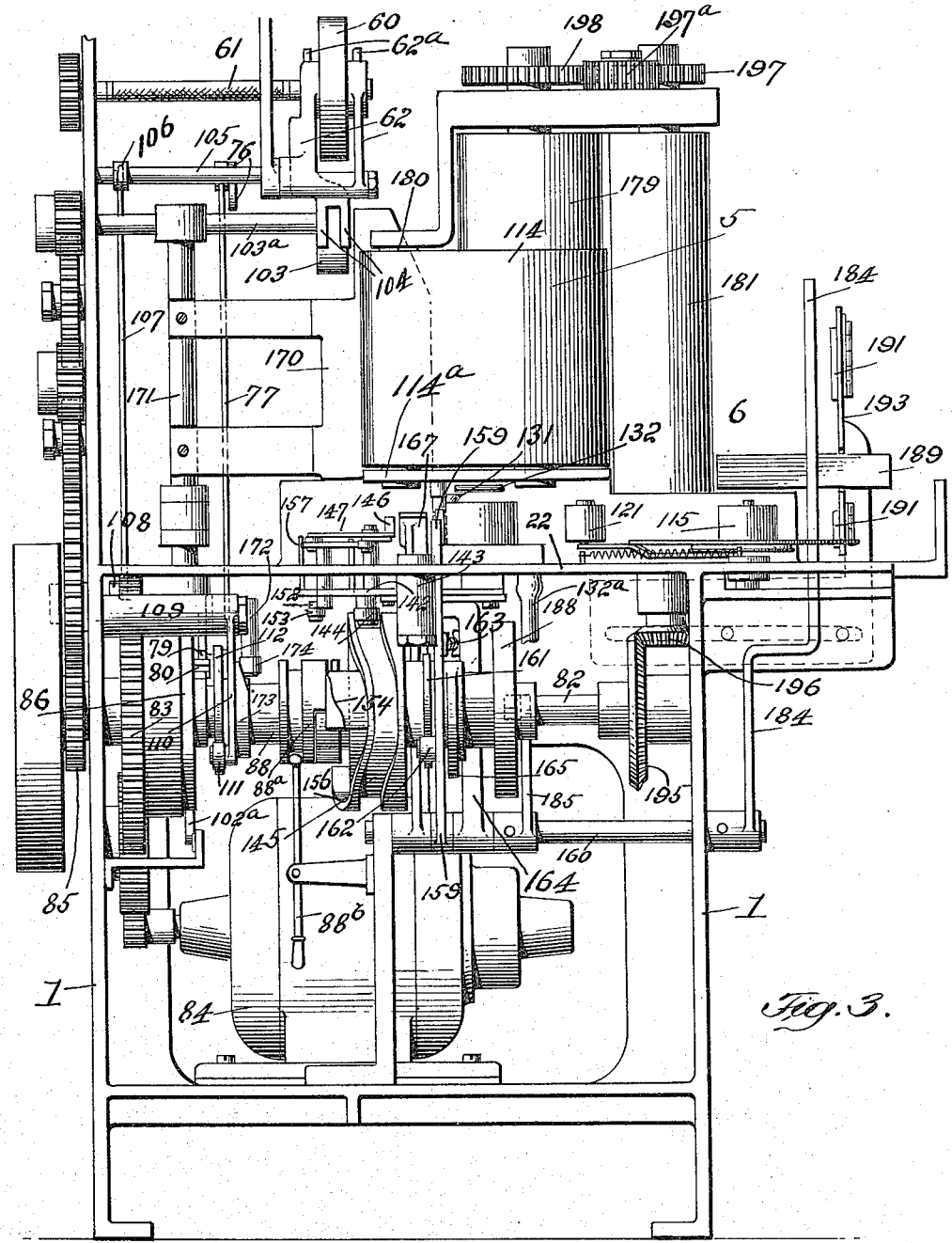

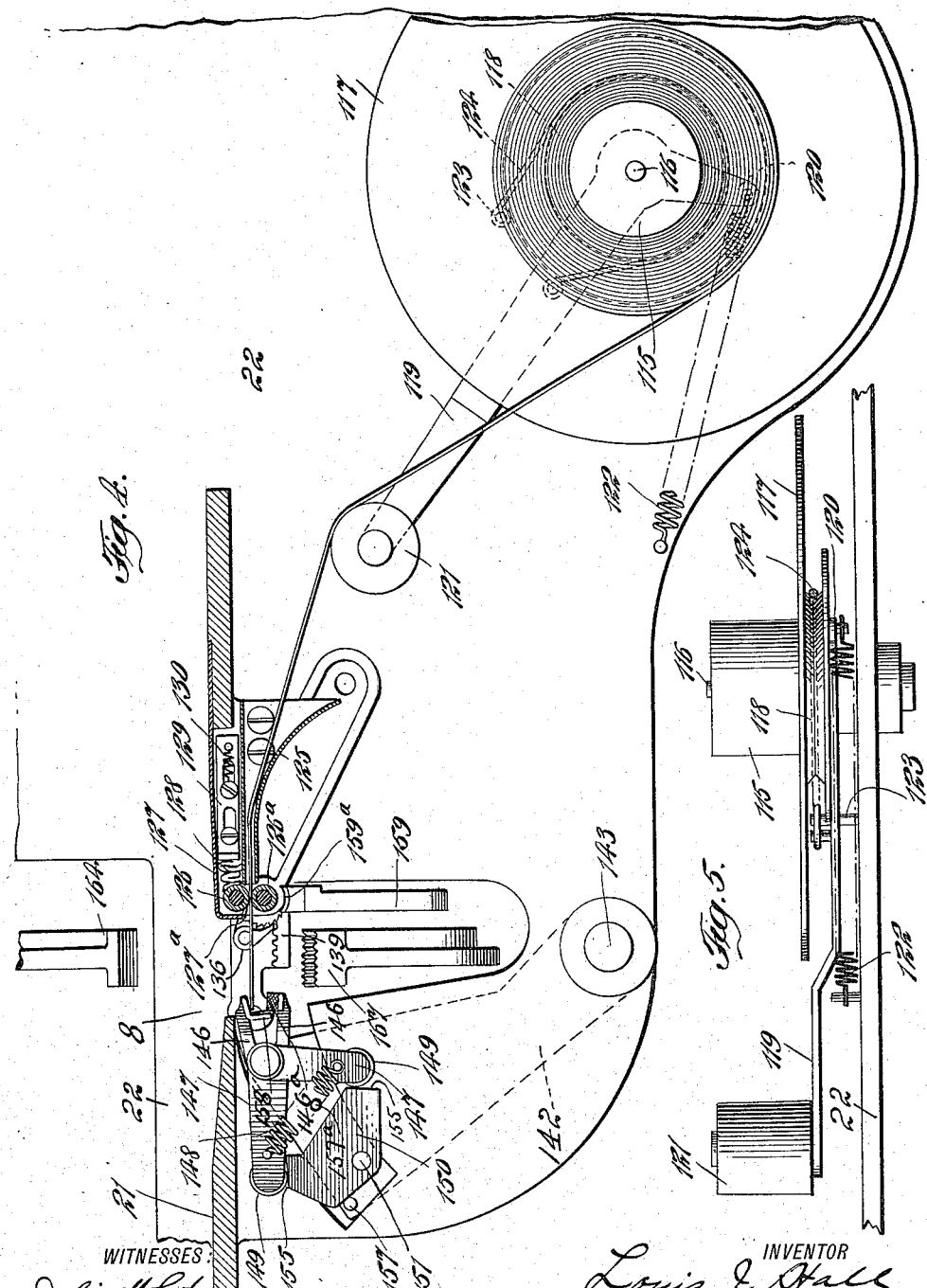

L. J. HALL.
MACHINE FOR SEALING AND STAMPING MAIL MATTER.
APPLICATION FILED FEB. 11, 1910.
1,173,263. Patented Feb. 29, 1916.
17 SHEETS—SHEET 6.
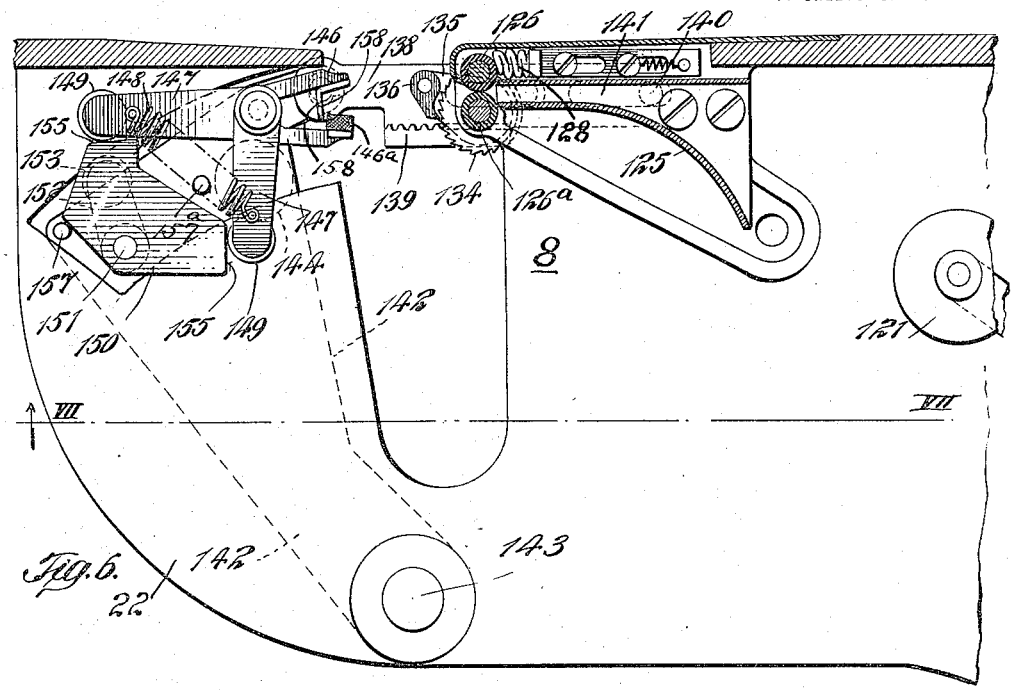
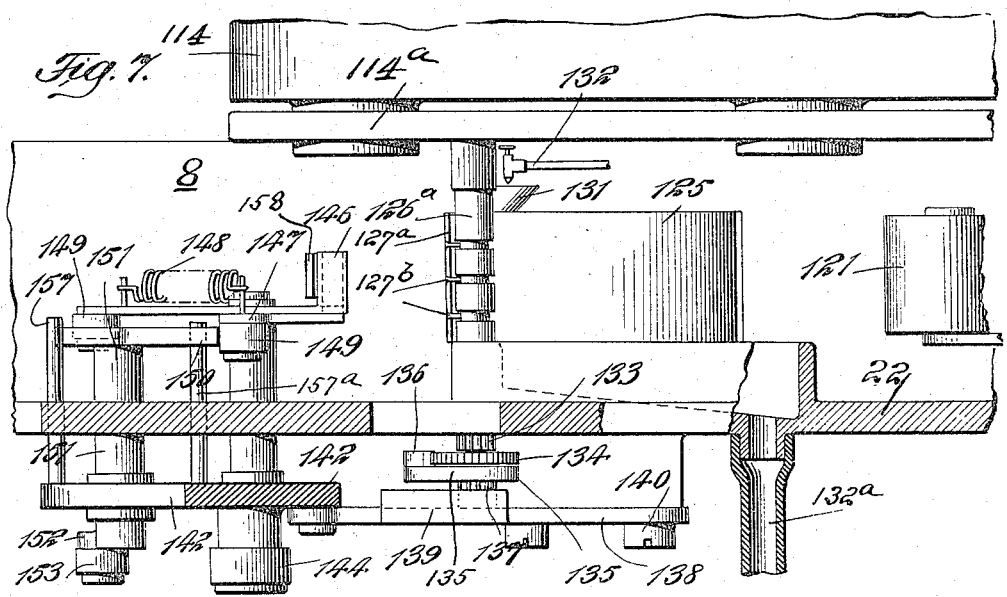
WITNESSES:
INVENTOR
Louis J. Hall
BY Davis & Davis
his ATTORNEYS L. J. HALL.
MACHINE FOR SEALING AND STAMPING MAIL MATTER.
APPLICATION FILED FEB. 11, 1910.

1,173,263.

Patented Feb. 29, 1916.
17 SHEETS—SHEET 7.

WITNESSES

INVENTOR
Louis J. Hall
BY
Davis&Davis
ATTORNEYS

L. J. HALL.
MACHINE FOR SEALING AND STAMPING MAIL MATTER.
APPLICATION FILED FEB. 11, 1910.
1,173,263.
Patented Feb. 29, 1916.
17 SHEETS—SHEET 8.
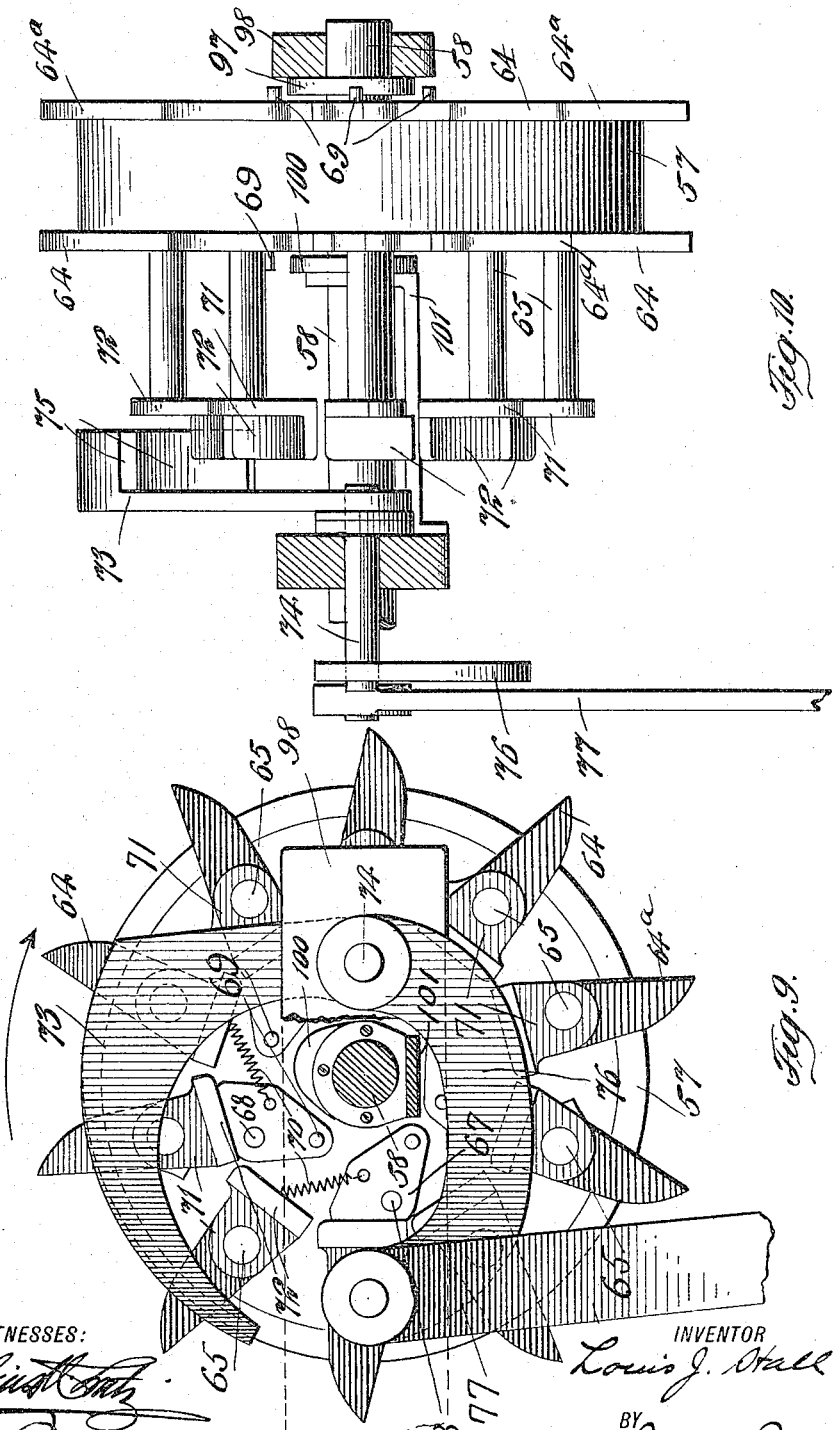

L. J. HALL.
MACHINE FOR SEALING AND STAMPING MAIL MATTER.
APPLICATION FILED FEB. 11, 1910.
1,173,263.
Patented Feb. 29, 1916.
17 SHEETS—SHEET 9.
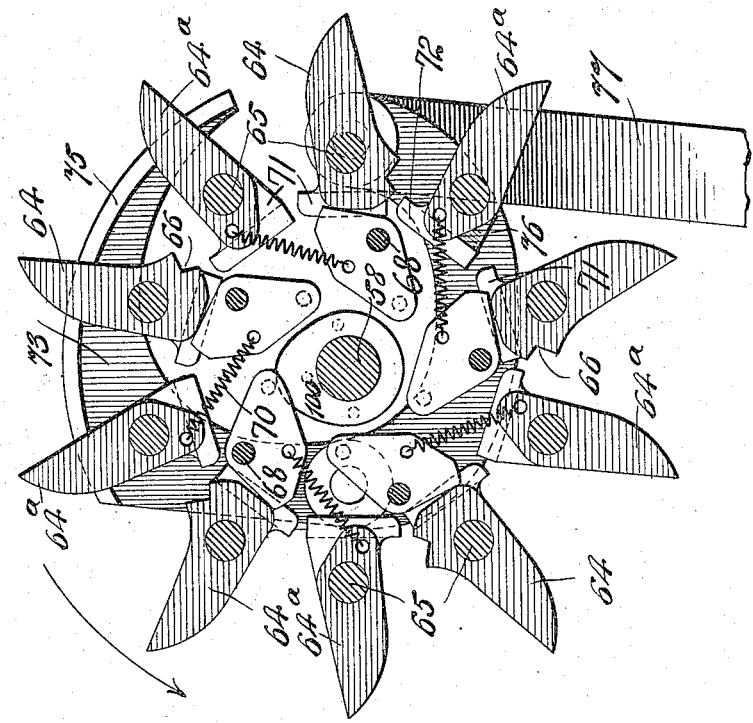
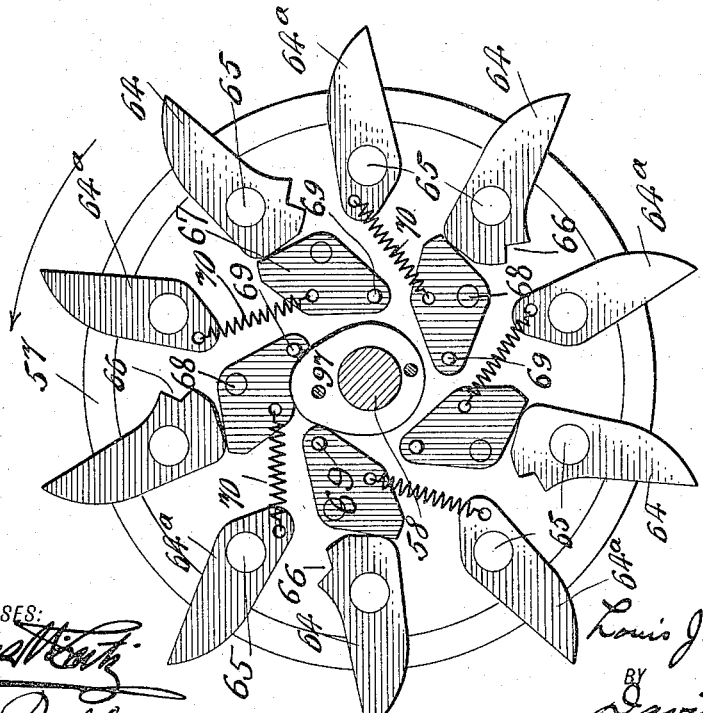

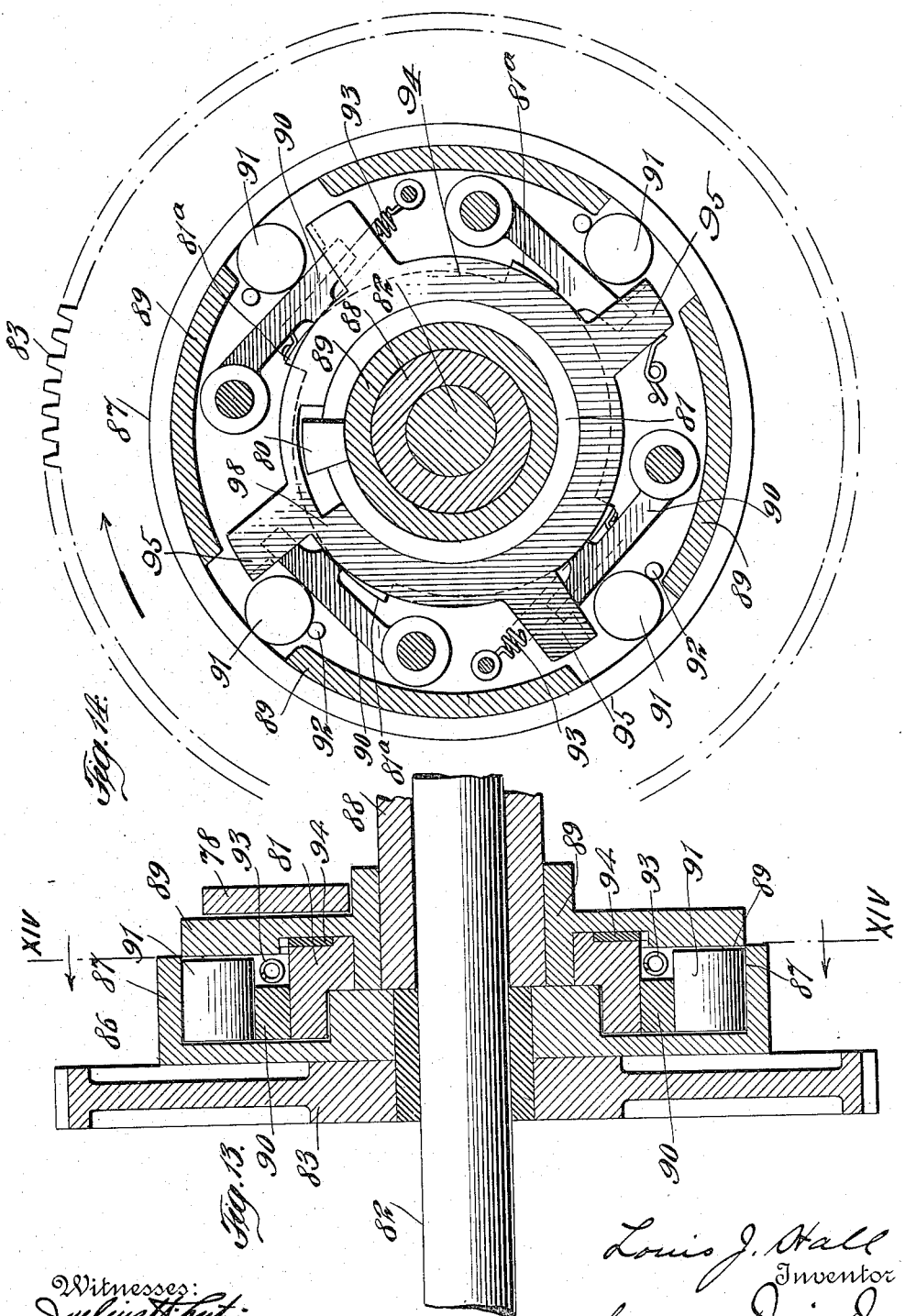

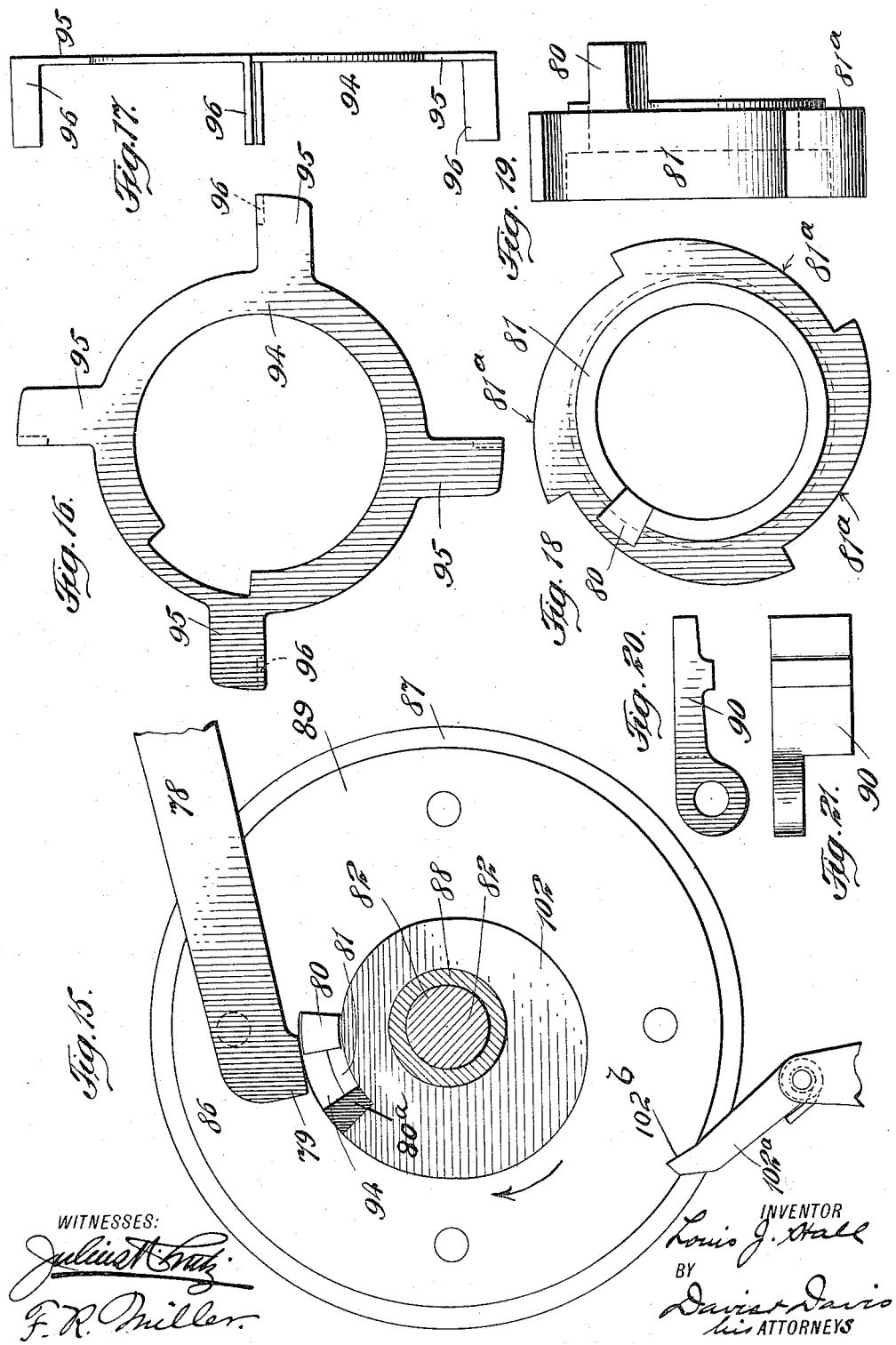

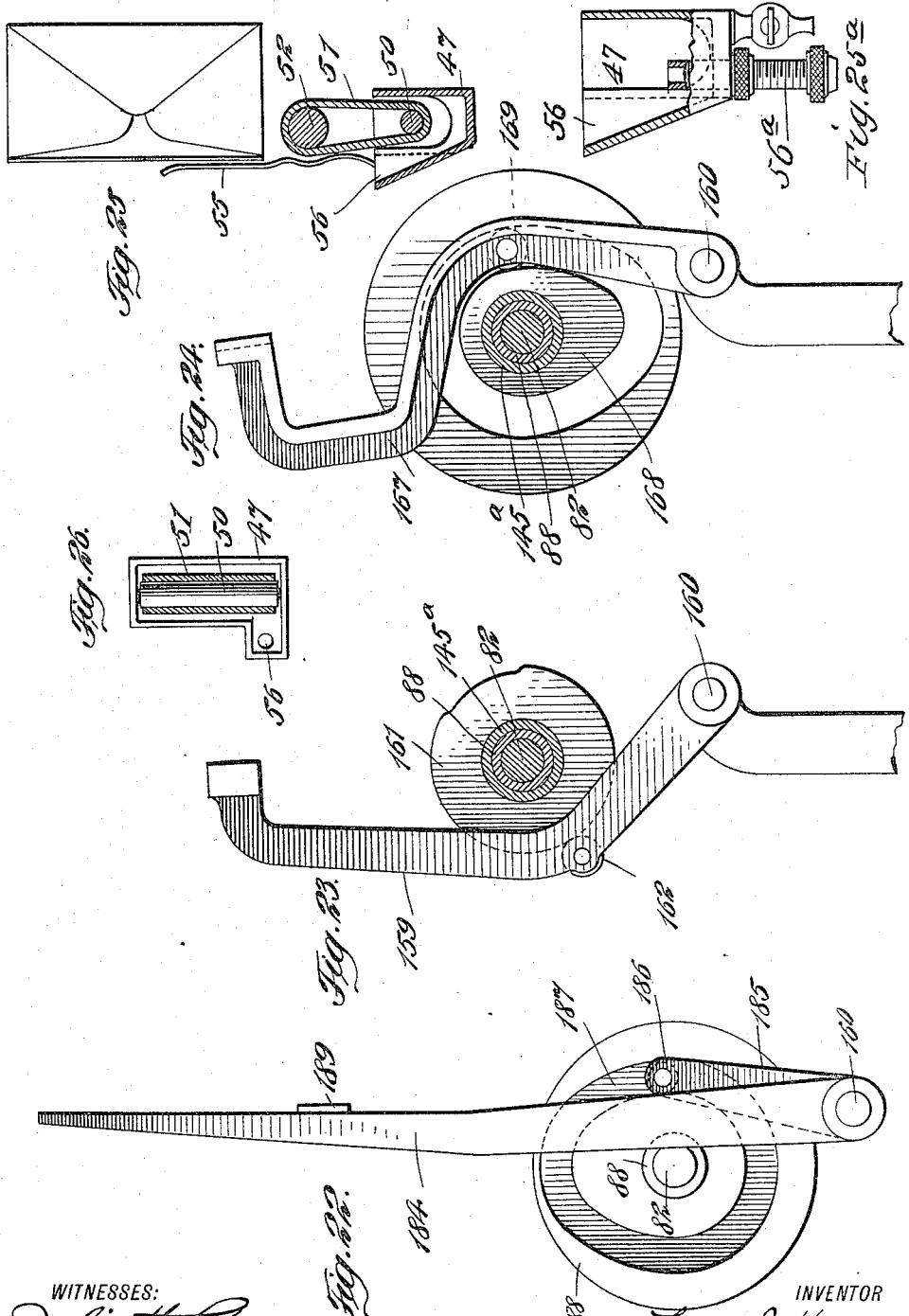

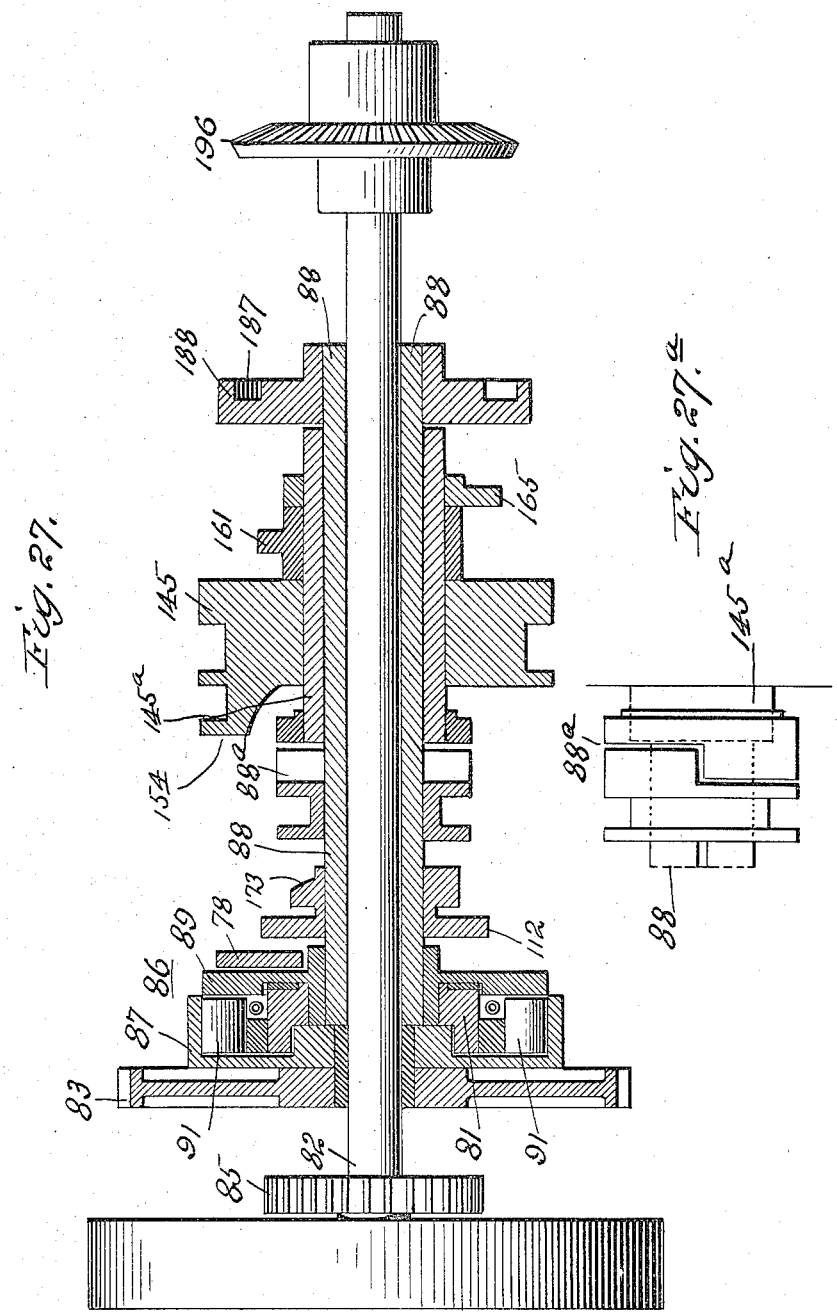

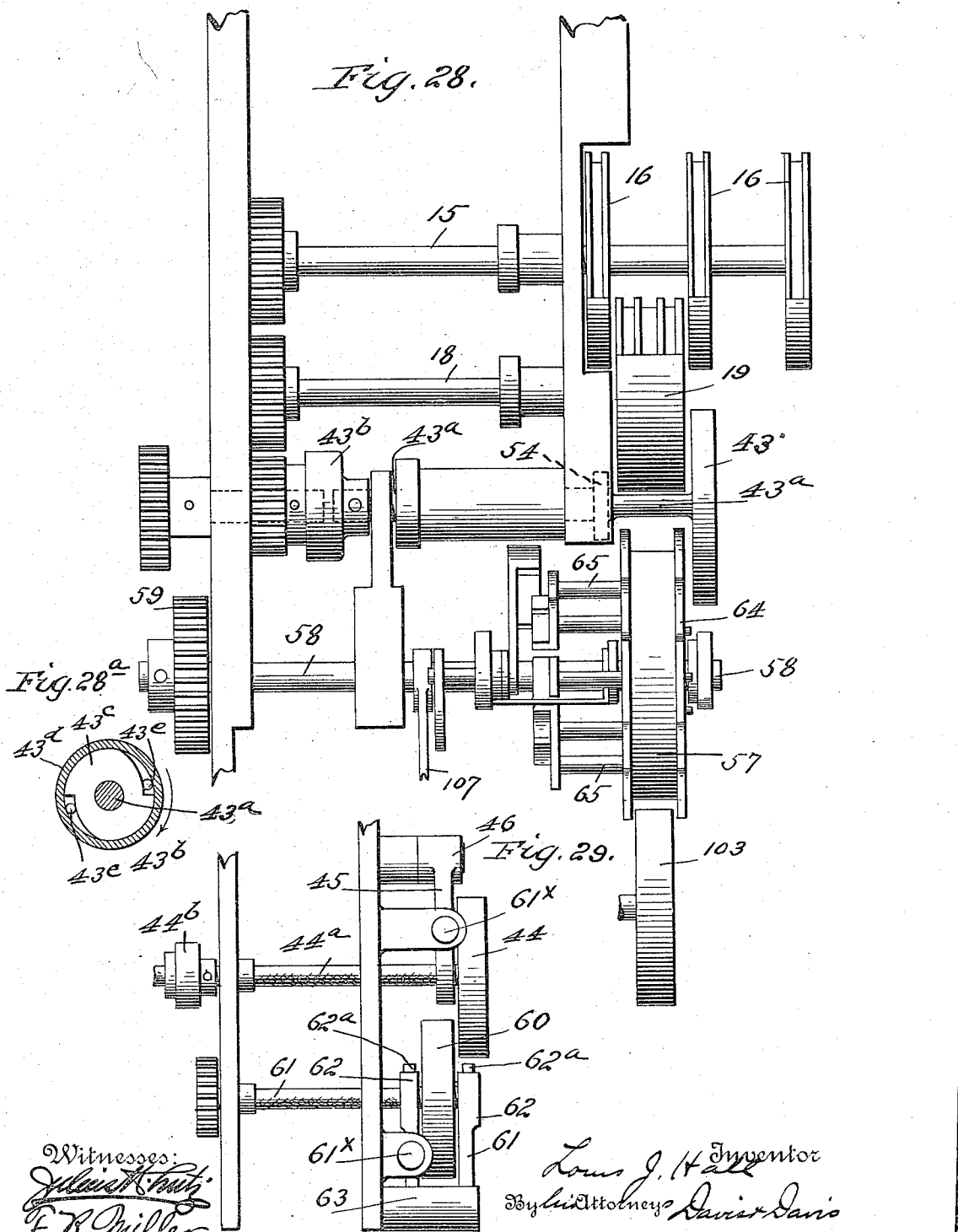

L. J. HALL.
MACHINE FOR SEALING AND STAMPING MAIL MATTER.
APPLICATION FILED FEB. 11, 1910.
1,173,263. Patented Feb. 29, 1916.
17 SHEETS—SHEET 15.
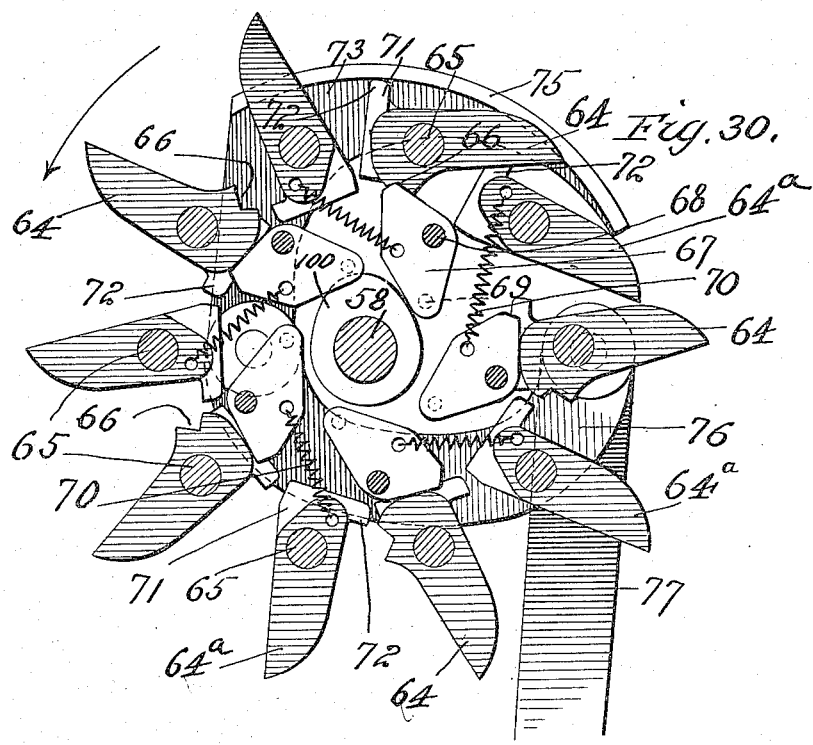
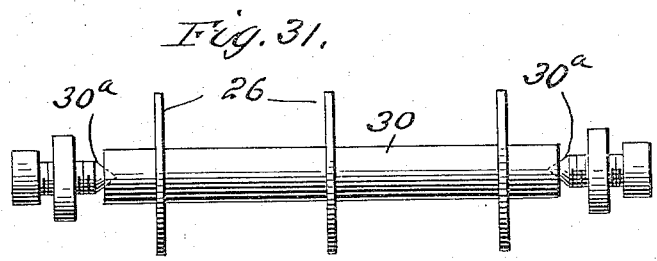
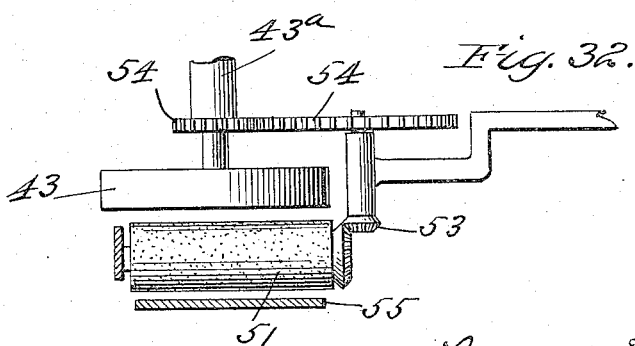

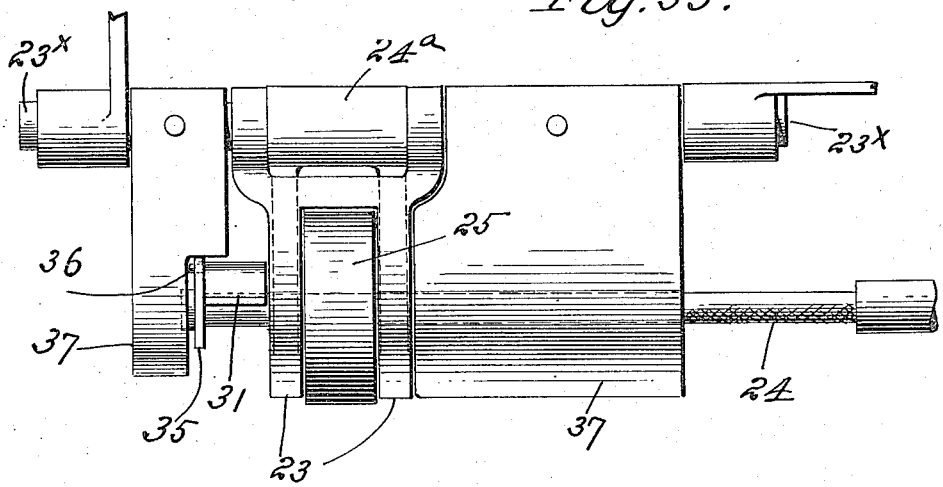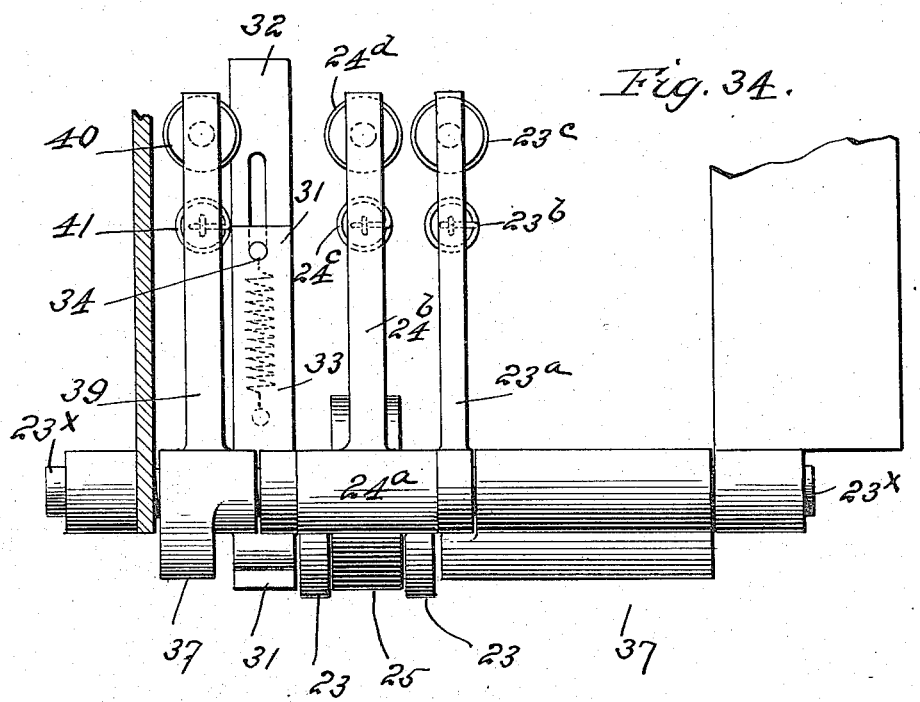

UNITED STATES PATENT OFFICE.

LOUIS J. HALL, OF FREEPORT, NEW YORK, ASSIGNOR TO MORRIS-HALL MAIL CLOSER COMPANY, OF NEW YORK, N. Y., A CORPORATION OF DELAWARE.

MACHINE FOR SEALING AND STAMPING MAIL-MATTER.

1,173,263. Specification of Letters Patent. Patented Feb. 29, 1916.

Application filed February 11, 1910. Serial No. 543,346.

*To all whom it may concern:*

Be it known that I, LOUIS J. HALL, a citizen of the United States, and resident of Freeport, county of Nassau, and State of New York, have invented certain new and useful Improvements in Machines for Sealing and Stamping Mail-Matter, of which the following is a complete specification, reference being had therein to the accompanying drawings, in which—

Figure 1:
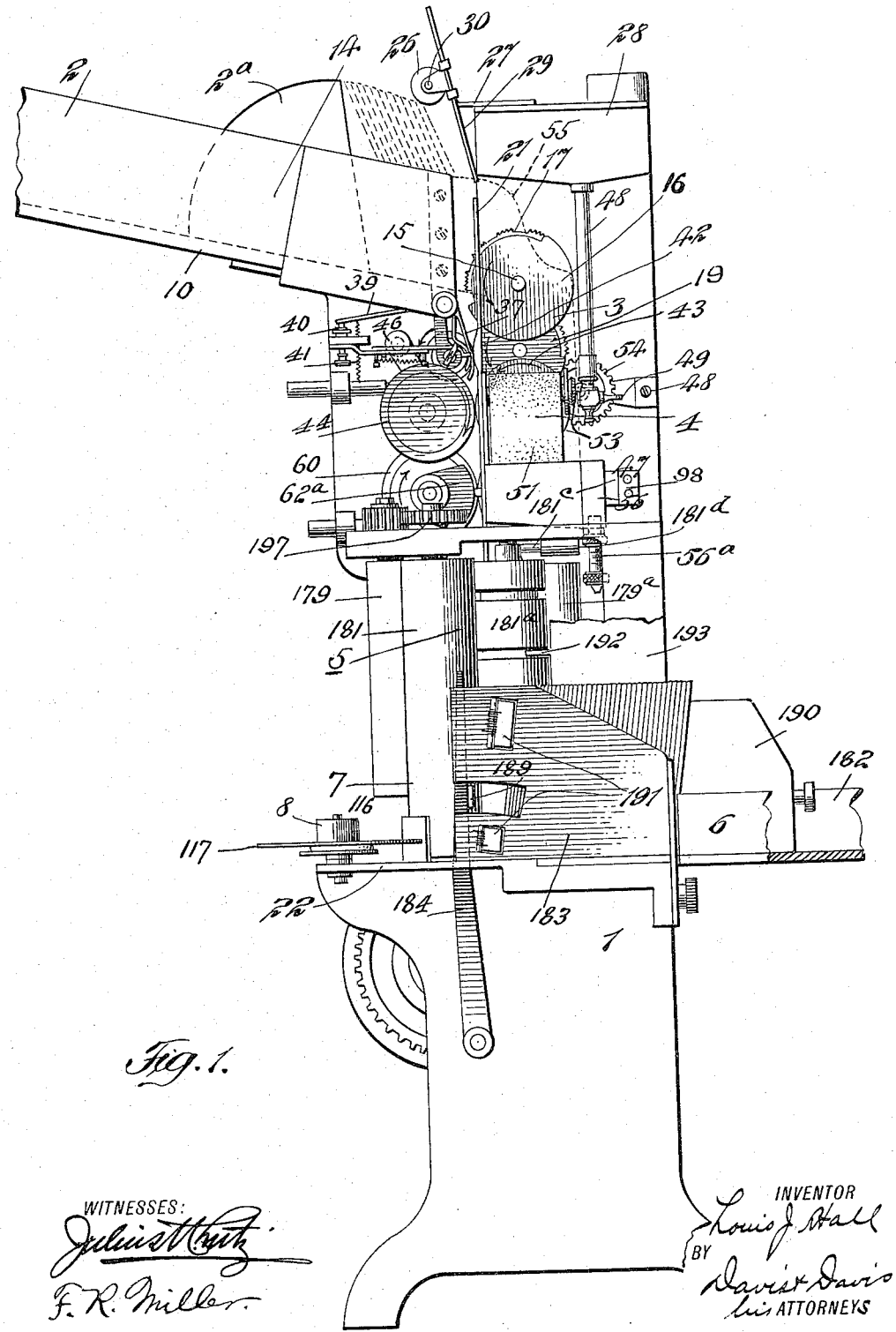
Figure 2:
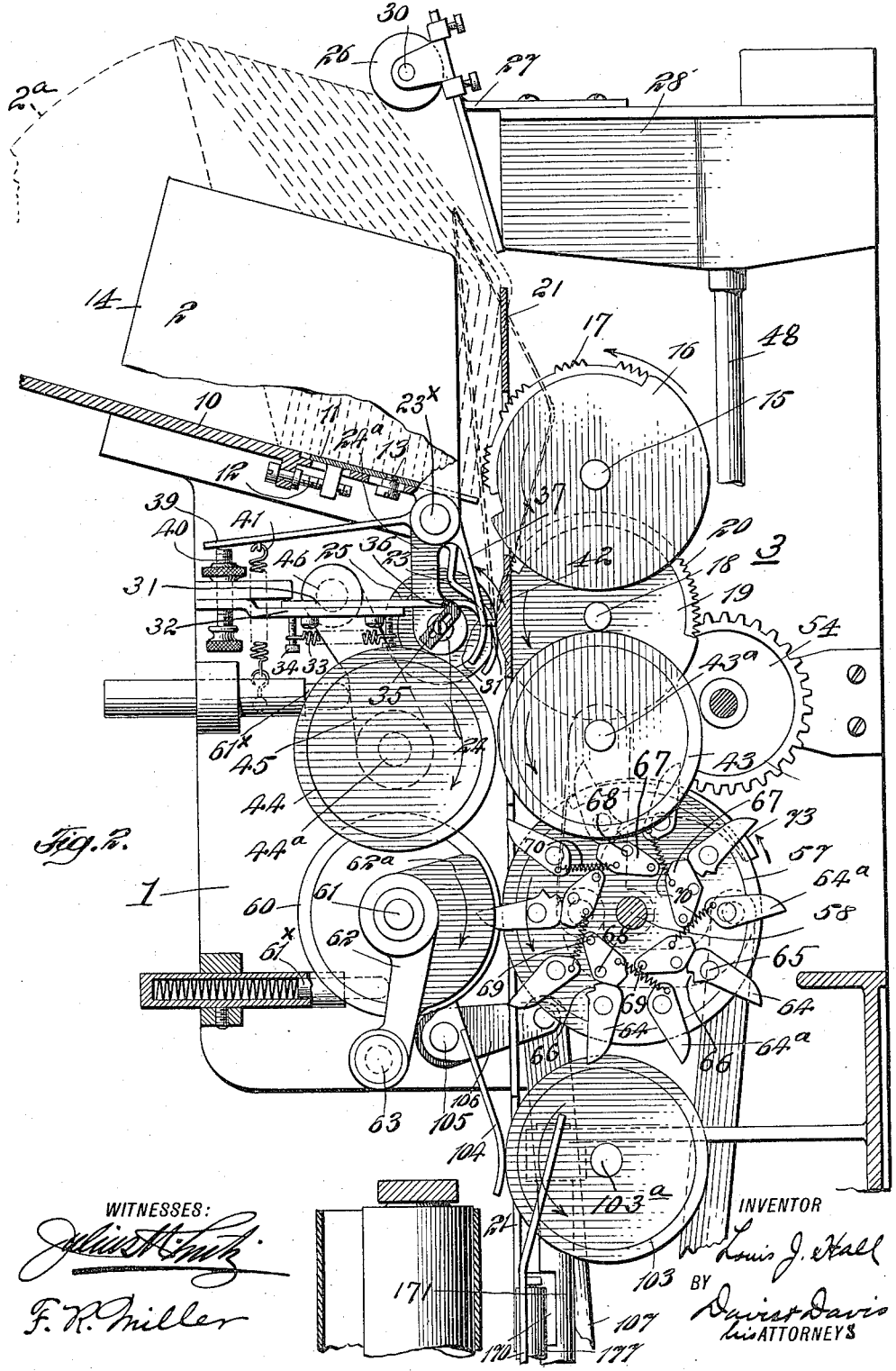
Figure 8:
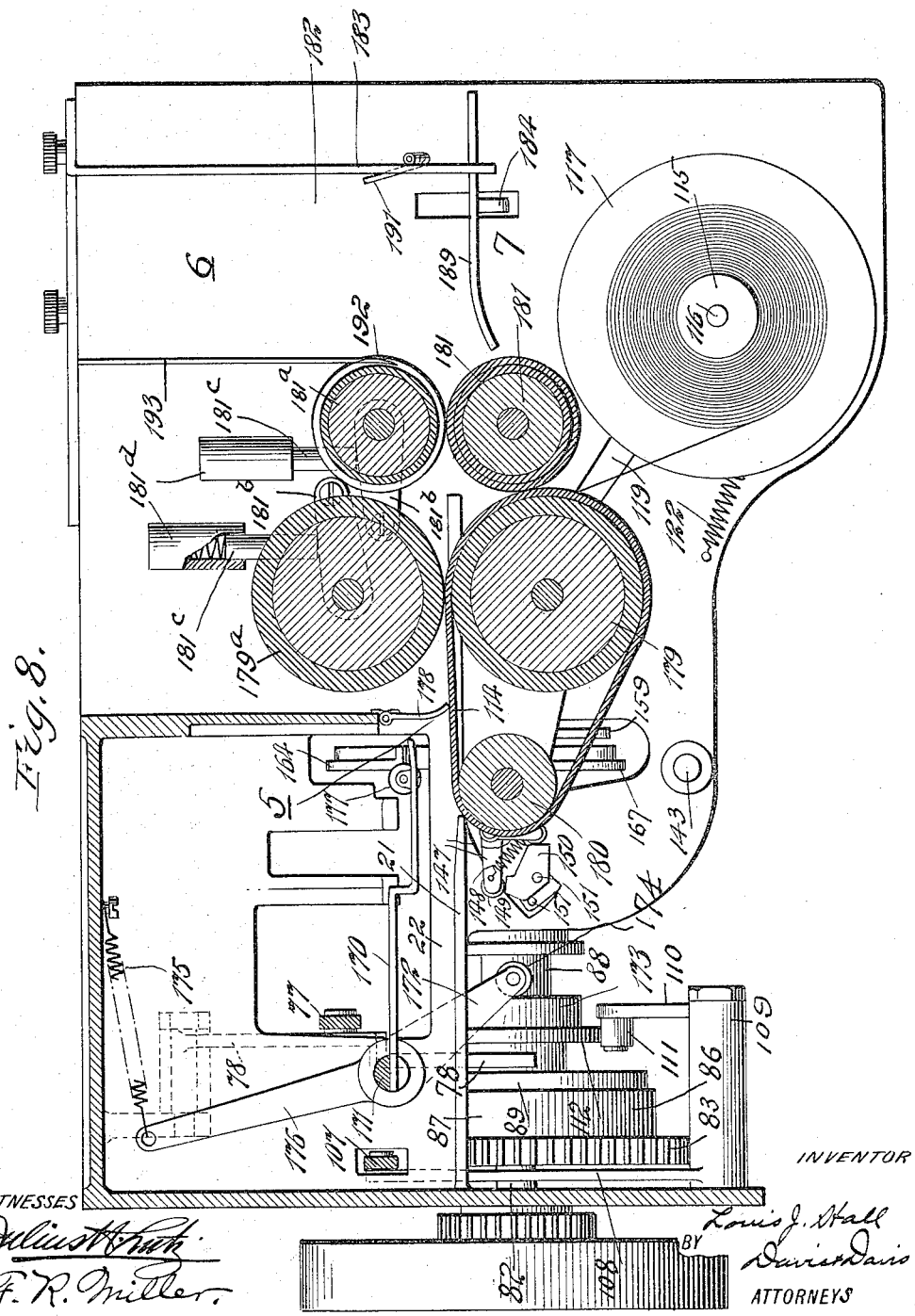
Figure 35:
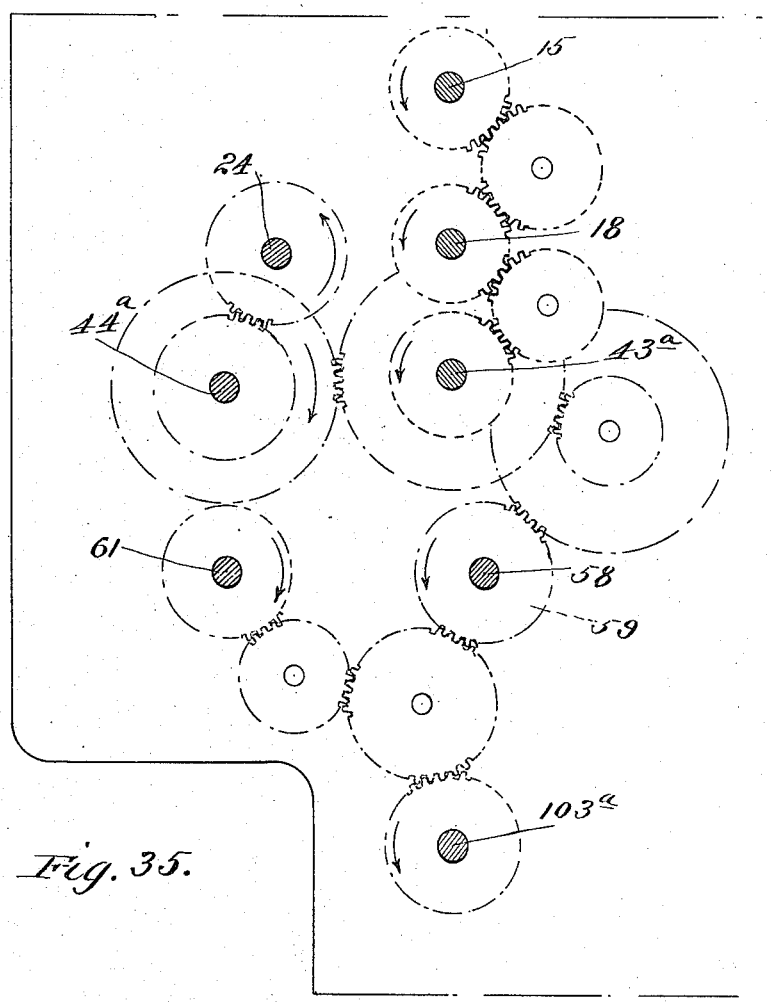

Figure 1 is a side elevation of the machine; Fig. 2 a vertical transverse sectional view of the upper portion of the machine, the feed rolls being shown in end elevation; Fig. 2$^a$ a similar view of the lower portion of the machine, Figs. 2 and 2$^a$ constituting a vertical sectional view of the entire machine; Fig. 3 a front elevation of the lower portion of the machine; Fig. 4 a horizontal sectional view of a portion of the machine showing the stamp holding and feeding means; Fig. 5 a side elevation of the stamp holding reel and tension device; Fig. 6 a horizontal sectional view of the stamp strip feeding means; Fig. 7 a vertical sectional view of the sealing and stamping table showing the stamp strip feeding means in side elevation; Fig. 8 a horizontal sectional view showing the sealing and stacking devices; Fig. 9 a side elevation of the clutch operating means which controls the stamp feed; Fig. 10 a front elevation of the device shown in Fig. 9; Fig. 11 a side elevation of the feed roll carrying the controller fingers; Fig. 12 a side elevation of the clutch operating cam, the cam operating fingers and the controller connected thereto, the controller finger pivots being shown in section; Fig. 13 a vertical sectional view of the clutch which connects the driving mechanism to the stamp feeding and affixing means; Fig. 14 a vertical sectional view of the clutch taken on the line XIV—XIV of Fig. 13; Fig. 15 a detail side elevation of the clutch and the clutch operating dog; Fig. 16 a face view of the retaining ring of the clutch; Fig. 17 an edge view of said ring; Fig. 18 a face view of the cam ring of the clutch; Fig. 19 an edge view of said cam ring; Fig. 20 a side elevation of one of the cam dogs; Fig. 21 a plan view of the inner side thereof; Fig. 22 a side elevation of the stacker lever and its operating cam; Fig. 23 a side elevation of the lever for holding the stamp strip during the affixing operation, and its operating cam; Fig. 24 a side elevation of the stamp affixing lever and its operating cam; Fig. 25 a detail vertical sectional view of the flap moistening device; Fig. 25$^a$ a detail vertical sectional view showing the means for varying the level of the water in the tank of the flap moistening device; Fig. 26 a horizontal sectional view of the moistening belt, the liquid receptacle being shown in plan view; Fig. 27 a vertical sectional view of the sleeves and cams carried by the main driving shaft; Fig. 27$^a$ a detail plan view of the clutch for connecting and disconnecting the sleeves 88 and 145$^a$; Fig. 28 a front elevation of the upper portion of the machine showing the feed rolls on one side of the envelop track, the rollers and other mechanism on the other side of said track being removed; Fig. 28$^a$ a detail sectional view of one of the clutches carried by the shafts 43$^a$ and 44$^a$; Fig. 29 a front view showing the two feed rolls which are removed from Fig. 28; Fig. 30 an end elevation of the controller fingers and the cam for operating the stamp feed clutch, several of the fingers being turned inwardly to operate the cam; Fig. 31 a side elevation of the envelop holder adapted to engage the upper edges of the envelops; Fig. 32 a detail plan view of the flap moistening apron and its operating means; Fig. 33 a side elevation of the envelop retaining roll, the escapement, and the presser fingers operating in conjunction therewith; Fig. 34 a plan view of the devices shown in Fig. 33; and Fig. 35 a diagrammatic view of the gearing driving the shafts in the upper portion of the machine.

In the operation of the improved machine herein shown, it is contemplated that envelops to be sealed and stamped will be supplied in quantities to a magazine or holder from which they will be delivered one by one to the flap moistening and sealing mechanism, the said envelop in its passage being engaged by a controller mechanism which governs the operation of the stamp feeding, moistening and affixing mechanism. The envelop feeding means supports the unsealed envelops and feeds them, one by one, through the flap moistening operation of the machine. Means are provided for compressing the envelop at the moment when the flap is to be pasted thereto, thereby insuring the proper closing of the envelop. The envelop in its passage to the sealing mechanism is engaged by a controlling device by which the feeding and affixing of the stamps is regulated, said feeding and affixing means remaining inoperative when there is no envelop to be engaged by it. After the envelop has passed through the sealing means it is delivered to the receiving magazine or stack from which the envelops may be removed in quantities as they accumulate therein.

Referring to the various parts by numerals, 1 designates the main frame of the machine, 2 the receiving magazine in which the envelops to be sealed are stacked; 3 the envelop feeding means; 4 the flap moistening device; 5 the sealing means; 6 the stack or magazine for the sealed envelops; 7 the stacker device, and 8 the stamp feeding means. These various mechanisms will now be described in the order in which they operate upon the envelop.

*Magazine and separator.*—The magazine consists of a downwardly and inwardly inclined table or support 10 which is provided at its lower delivery end with a part 11 which may be adjusted by means of the screw 12 and locked in its adjusted position by the lock screw 13. By this means a limited number of envelops are allowed to pass to the separator rolls at one time as will be more fully hereinafter described. The magazine is formed with a side 14 on which one edge of each envelop bears. In the magazine and traveling on the inclined bottom thereof is a feeding weight 2$^a$ by means of which the envelops are kept pressed into contact with the releasing device 26.

On a horizontal shaft 15 directly in front of the open lower end of the magazine and slightly above the delivery end of the adjustable plate 11 is mounted the first separator roll 16, said roll comprising three separated parallel disks so located as to engage the face of the foremost envelop. The envelops are arranged in the magazine with their longest edges vertical and their flaps extended, as indicated in dotted lines in Fig. 1, so that the first separator roll will engage the envelop on its sealing side. A portion of the periphery of the first separator roll is formed of rubber 17, having horizontal serrations therein at intervals, in order to increase the gripping effect of the roll on the envelop. This roll is arranged to rotate in the direction indicated by the arrow in Fig. 1, and serves to deliver the envelops downwardly into the machine and off the edge of the plate 11. On a horizontal shaft 18 located directly below shaft 15 is the second separator roll 19, said roll having a broad face and operating between two of the disks of the roll 16 and serving to engage the envelops below the first roll. A portion 20 of this roll is also formed of rubber which is horizontally serrated. A portion only of the rolls 16 and 19 is formed of serrated rubber, for the reason that these rolls time the feeding of the envelop. They operate in time with the escapement 31, which will be hereinafter described, and exert a strong feeding impulse on the one envelop when it is needed and do not exert any appreciable feeding pressure when the escapement is holding back the envelops. This avoids injury to the envelop; avoids crowding an envelop against the escapement, and allows the retaining roll, which will be hereinafter described, to more easily hold back succeeding envelops. Furthermore, the feeding impulse caused by the edge of the rubber as it strikes the envelop is stronger than if the rubber were continuous. A vertical guide plate 21 is arranged opposite the open delivery end of the magazine and between it and the separator rolls, said plate extending vertically downwardly almost to the stamping and sealing table 22 and forming a guide for the envelops throughout their downward movement. This plate is slotted to permit the separator and feed rolls to project through it.

In bearings on the lower portion of the magazine at the delivery end thereof is a rock shaft 23$^x$. On said rock shaft is loosely mounted a depending bifurcated link 24$^a$ in the lower end of which is journaled one end of a horizontal shaft 24. On this shaft and between the arms of the link 24$^a$ is secured a retaining roll 25 having preferably a rubber periphery, and being so arranged that it will lie very close to the periphery of the second separator roll 19. To yieldingly hold the retaining roll in proximity to the roll 19 an outwardly extending arm 24$^b$ is connected to the upper end of the link 24$^a$, (Figs. 2 and 34) and to the outer end of said arm is connected one end of a spring 24$^c$, the other end of said spring being connected to a rigid stop. To limit the movement of the arm 24$^b$ and to regulate the position of the retaining roll with respect to the separator roll, is provided an adjustable stop 24$^d$. This retaining roll is rotated in the direction indicated by the arrow in Fig. 2, and in the same direction as the rotation of the separator roll so that their adjoining faces move in opposite directions. On the rock shaft 23$^x$ is loosely mounted a curved presser finger 23 which directs the envelops between the second separator roll and the retaining roll. This presser finger is bifurcated and straddles the retaining roll in order to engage the envelop on both sides of said roll, to press the envelop against the second separator roll below the center of the retaining roll. This increases the feeding power of said roll and insures the passing of the envelop into the bite of rolls 43 and 44. The upper end of this presser finger is also bifurcated, and embraces the rock shaft on both sides of the link 24ª. Carried by the presser finger and extending outwardly therefrom in a substantially horizontal position is an arm 23ª, to which is connected a spring 23ᵇ, the other end of said spring being connected to a suitable rigid stop. The end of said arm bears against an adjustable stop 23ᶜ, by means of which the position of the finger with respect to the roll 19 may be varied. It is manifest that the finger 23 may yield to permit envelops of different thicknesses to pass downwardly. The purpose of the retaining roll is to prevent more than one envelop being fed downwardly by the separator rolls and it will be readily seen that by rotating as described its tendency will be to lift the envelops and return them toward the magazine. It is clear that the friction of the two separator rolls on an envelop will readily overcome the friction of the retaining roll, and that, therefore, this latter roll will not prevent the proper feeding of a single envelop. If, however, two envelops pass downwardly from the magazine the one which is engaged by the two separator rolls will be moved on downwardly in the machine. A section of the shaft 24 of the retaining roll is made flexible in order that said roll may be free to swing outwardly away from the separator rolls while at the same time permitting its outer end to be arranged in fixed bearings, (Fig. 33).

In order to hold the envelop in proper position to be automatically fed from the magazine, I provide a sensitive anti-friction holding device 26 for the upper edges of the envelops. This holder is mounted on an adjustable bracket 27 connected to a water tank 28, which will be hereinafter described, said holding device being vertically adjustable on said bracket in order to properly place it on the upper edges of envelops of different lengths. By means of this holding device the envelops are held in an inclined position, as indicated in Fig. 1, so that their lower edges will be properly presented to the separator rolls. I have found that by providing this device the feeding of the envelops will proceed automatically without any likelihood of the machine becoming clogged by reason of the uneven feed of envelops. This holding device consists of three small disks or rolls separated suitable distances and secured upon a shaft 30, (Fig. 31) and said shaft is journaled on centering points 30ª so that it will rotate with very little friction. In the magazine is arranged a feed weight 2ª which automatically moves down the inclined bottom of the magazine and feeds the envelops off the end of the stop plate 11, keeping said envelops pressed against the feed rolls 16. The upper edges of the envelops bear against the holding device, keeping said edges pressed backward beyond the free edge of the plate 11 and causing the envelops to incline upwardly and outwardly away from the feed roll until they drop off the edge of said plate. This prevents an excessive number of envelops crowding down between the separator roll and the plate 11, permitting only envelops enough to fill the space between said plate and the separator roll to drop from said plate. It will thus be seen that the envelops are fed automatically without any danger of crowding the machine and that the attendance of an operator to feed the envelops is unnecessary.

Substantially on a level with the centers of the second separator roll and the retaining roll is arranged a reciprocating escapement 31, said escapement being supported by and reciprocating on a horizontal bracket 32 suitably supported in the frame of the machine. (Figs. 2, 23 and 34.) This escapement normally prevents any envelops from passing, but at the proper time, that is, at the time when the rubber portions of the rolls 16 and 19 engage an envelop, recedes slightly to allow one envelop to pass.

The escapement is yieldingly pressed against the guide plate 21 by means of a spring 33, one end of which is connected with the escapement through a screw 34, the other end of said spring being connected to a rigid part carried by the bracket 32. On the shaft of the retaining roll is arranged an escapement-operating finger 35 which is adapted to engage a pin 36 on the edge of the escapement. This operating finger is so timed in its movement with respect to the separator rolls that it will move the escapement outwardly and away from the guide plate 21 at the proper time and just sufficiently to permit a small portion of one envelop to pass below said escapement. The action of the escapement is so timed that it will permit the separator rolls to move the end of one envelop downwardly below the point of contact between said rolls and the retaining roll and will almost instantly return to its holding position pressing lightly against the face of the passing envelop to retain the second envelop should there be one engaged by the retaining roll, said second envelop resting on said escapement, the pressure of the escapement not being sufficient to retard the passing envelop.

In order to support the envelops and hold them in proper position for the feed and separator rolls I provide a pair of guide plates 37 which are rigidly secured at their upper ends to the rock shaft 23ˣ, their lower ends forming guides and supports to hold the envelops in position to be engaged by the second separator roll and the retaining roll. One of the guides 37 is provided with an arm 39 which is adapted to be adjusted by a screw 40, and is maintained yieldingly in position by a spring 41. The arms 23ª, 24ᵇ and 39 with their adjusting screws and retaining springs are identical, and the operation of these devices will be readily understood from what is shown in Fig. 2 of the arm 39 and its adjusting screw and spring. The vertical guide plate 21 is curved outwardly at 42 to insure the envelops contacting with the escapement 31.

From the foregoing it is thought the operation and construction of the magazine and the separator will be readily understood.

*Flap moistener.*—Below the separator rolls and on each side of the envelop path are arranged feeding or conveying rolls 43 and 44, the shaft 43ª of the roll 43 being mounted in rigid bearings. The left end of the shaft 44ª is mounted in a rigid bearing in the machine frame while the right end of said shaft 44ª is mounted in a bearing in the lower end of a depending swinging link 45, the upper end of said link being pivoted at 46 to the main frame, Figs. 2 and 29. The shaft 44ª is flexible and as link 45 is held in position by a spring, roll 44 can yield to allow for varying thicknesses of envelops. These two rolls are adapted to engage the envelop and to move it downwardly as will be more fully hereinafter described. To permit the envelop to be withdrawn rapidly from the conveyer or feed rolls 43 and 44, the shafts of said rolls are formed in two parts connected together by means of friction clutches 43ᵇ and 44ᵇ, Figs. 28, 29 and 28ª. These clutches each consist of a driving member 43ᶜ and a driven member 43ᵈ. The driving member is formed with tapering recesses or sockets in its periphery in each of which is arranged a clutch roller 43ᵉ. It will be readily seen that when the rolls 43 and 44 are rotated more rapidly than the driving portion of the shaft, the driven portion thereof may rotate independently of the driving portion, the clutch rollers moving back into the larger end of the recesses in the driving member. These clutches permit the rolls to rotate in one direction independently of the driven portion of the shaft so that they may have a speed greater than the normal speed of their shafts when the envelop is drawn downwardly by the high-speed feed rolls, as hereinafter set forth. By this means all danger of tearing or disrupting the envelops is avoided.

In the main frame below the conveyer roll 43 and close to one end thereof is arranged a water tank 47 which is adapted to receive water from the main tank 28 through a drip pipe 48, said pipe being provided with a regulating valve 49. In the tank 47 is journaled a small roll 50 over which travels a moistening apron 51, the upper end of said apron being carried by a large roll 52 which receives motion from a beveled gear 53, said gear being driven by suitable gearing 54 from shaft 43ª, Figs. 1, 25, 25ª, 26 and 32. Suitably supported in the machine is a flap guide 55 which guides the flaps of the descending envelops in contact with the moistening apron 51 as the said envelops move downwardly to the sealing rolls. The tank 47 is provided with a spout 56 into which water drips from the pipe 48. It will be readily understood that the envelop flap passes downwardly on the outer side of the tank. It is also clearly shown in Fig. 25 that the upper portion of the apron overhangs the edge of the tank, so that it is in a convenient position to be engaged by the envelop flap. The envelop guide 55 is so curved as to insure the contact of the envelop flap with the moistening apron, as clearly shown in Fig. 25.

Threaded in the bottom of the tank 47 is an overflow pipe 56ª, said pipe projecting a suitable distance above the bottom of said tank. This pipe may be adjusted in the tank to vary the height of the upper end thereof above the bottom of the tank. A surplus of water is supplied to the tank 47 through the pipe 48 and overflows through the pipe 56ª. This insures a sufficient depth of water in the tank and an even amount of moisture on the apron and on the envelop flaps. The amount of moisture supplied to the flaps may be varied by varying the height of the pipe 56ª, thereby increasing or decreasing the depth of water in the tank.

*Automatic control of stamp feed.*—From the conveying rolls the envelop passes downwardly between the high-speed feed rolls, one of which also forms the controller roll of the device for automatically controlling the feed of stamps. The object of this device is to maintain the stamp feeding means inactive whenever an envelop fails to feed, the presence of an envelop between the rolls of the controlling device rendering said device operative to connect the driving shaft of the machine with the stamp feeding mechanism. This controlling mechanism consists of a main roll 57 larger in diameter than the other feed rolls and arranged below the separator roll 19 and in the vertical plane thereof. This roll is mounted on the shaft 58 carrying a gear 59 by which it is driven at a high rate of speed, the speed of this roll being preferably four or five times that of the separating and conveying rolls, Figs. 2 and 28. On the opposite side of the envelop path from the roll 57 is a presser roll 60, driven at the same peripheral speed as roll 57 and in the opposite direction. The object of driving these rolls at such a high rate of speed is to project the envelop into the stamp affixing mechanism and permit it to dwell there sufficiently to permit the stamp to be affixed and then be moved into the sealing mechanism before the next succeeding envelop is fed downwardly by the said rolls. It is obvious that by increasing the speed of the envelop when it reaches the rolls 57 and 60 considerable time is gained over the next succeeding envelop, and that, therefore the envelop may dwell in the stamp affixing means an interval equal to the gain in time over the next succeeding envelop. By this means the envelop may be held in the stamp affixing means without interrupting or stopping the operation of any of the parts of the machine.

The shaft 61 of roll 60 is flexible, and is mounted in the upper ends of links 62. These links are pivoted at their lower ends at 63 in the main frame, Figs. 2 and 29. The feed roll 44 and the presser roll 60 are pressed inwardly against their co-acting rolls by spring-pressed plungers 61$^x$ so that said rolls will be yieldingly held in position and will move outwardly away from their corresponding rolls, if sufficient pressure is applied thereto in the proper direction, to permit envelops of different thicknesses to pass. On the vertical faces of the controller roll 57 are pivoted ten controller fingers 64 which project beyond the periphery of the roll, the projecting ends thereof being rounded off in the direction of rotation of the controller roll and being of sufficient length to extend across the path of the descending envelop and to overlap the presser roll 60 when there is no envelop present between said roll Figs. 2, 9, 10, 11, 12 and 30. In the drawings I have shown ten pairs of controller fingers, each pair being mounted upon a spindle or shaft 65 extending through the roll 57 and arranged to move together with their spindle. Every alternate finger is formed with a notch 66 at its inner end which is adapted to be engaged by a locking dog 67 pivoted on the face of the roll adjacent the inner ends of the controlling fingers. These locking dogs are mounted on pivots 68 and carry at their inner ends releasing pins 69. To each locking dog is connected a coil spring 70 which normally tends to throw the adjoining controller fingers to their outer positions and to throw the locking dog into locking engagement with the controller finger, one end of said spring being connected to the inner end of the intermediate controlling fingers 64$^a$.

As shown in the drawings there are ten sets of controlling fingers, but there are only ten fingers formed with notches, five of said fingers being on each face of the controller roll. It is manifest that by locking one end of a spindle both of the controlling fingers carried by said spindle will be locked in position. Five locking dogs are arranged on each face of the controlling roll, as shown clearly in the drawing.

It is manifest that an envelop is fed downwardly between the controller roll and the presser roll, it will be engaged by the curved projecting ends of the fingers 64 and 64$^a$. As these fingers are held in their extended positions by the light springs 70, they will be turned back within the periphery of the controller roll by the envelop Fig. 30. When they are thus turned back the corners of the locking dogs will be engaged in the notches 66 of said controller fingers 64 and will hold said fingers and the corresponding fingers 64$^a$ in their inner position until said locking dogs are released. The spindles 65 are extended beyond one side of the controller roll 57 and carry on their extended ends tripping fingers 71, Fig. 10 which are formed on their inner ends with flanges 72, said flanges being adapted to engage and move a clutch operating cam 73. Cam 73 is rigidly secured on a rock shaft 74 suitably supported in the main frame. The clutch operating cam 73 is formed with a flange 75 which extends inwardly toward the cam operating fingers 72, the inner surface of said flange being eccentric with respect to the shaft 58 of the controlling roll, and so arranged that when the controlling fingers are in their inner positions the flanges of the cam tripping fingers will engage said cam flange and gradually move it outwardly during the rotation of the controlling roll and thereby rock shaft 74, Fig. 30. When the locking dogs are released from the notches in the controlling fingers they will swing to their inner positions, as shown in Fig. 12 and will not engage the eccentric flange on the clutch-operating cam.

Secured rigidly to the rock shaft 74 is an arm 76, the outer end of which is connected to a depending link 77, said link at its lower end operating a clutch on the main shaft. The arm 76 is substantially horizontal and is so disposed with respect to the clutch-operating cam 73 that it will be swung upwardly as the said cam is moved upwardly by the tripping fingers, the link 77 being thereby raised. The lower end of the link 77 is connected to a clutch dog 78 having a head 79 at its free end which is adapted to engage an operating lug 80 on a clutch ring 81, as will be more fully hereinafter described, Figs. 3, 8 and 15. On the links 62 adjacent the vertical sides of the presser roll 60 are arranged concentric envelop supports 62$^a$, said supports preventing undue bending of the envelops by the controller fingers 64, Figs. 2 and 29.

The main shaft 82 carries a main driving gear 83 which is driven through suitable gearing by a motor 84. This shaft is also provided with a gear 85 through which power is transmitted to the gears operating the feeding and separating rolls, said rolls being constantly driven during the operation of the machine, Figs. 2$^a$, 3, 8, 14 and 27. The stamp feeding and affixing means operates intermittently and is dependent upon the presence of an envelop between the controlling roll, and this intermittently operating stamp feeding means is connected and disconnected from the main shaft by the clutch 86, said clutch being operated by the dog 78, Figs. 14 and 15. This clutch consists of a driving member 87 rigidly attached to the main driving gear 83, said driving member being in the form of a circular clutch rim concentric with the drive shaft. Mounted loosely on the drive shaft is a sleeve 88, said sleeve carrying the driven member 89 of the clutch, said driven member being formed with an annular flange adapted to fit within the clutch rim of the driving member. Loosely mounted on the hub of the driven member and arranged between the driven and driving members of the clutch is the clutch ring 81, heretofore referred to, said clutch ring being provided with the laterally extending operating lug 80, heretofore referred to. This lug extends outwardly through a slot in the driven member. This ring is formed on its face with four ratchet-like cams 81$^a$, Figs. 18 and 19. On the face of each of these cams rides a pivoted clutch dog 90, Fig. 20. Adjacent the ends of these clutch dogs the rim of the driven member is cut out or notched, as shown in Fig. 14 and between the outer surfaces of the clutch dogs and the inner surface of the rim of the driving member are arranged clutch rolls 91, said rolls fitting in the notches or slots in the flange of the driven member. To prevent the rolls escaping from said notches stationary pins 92 are provided with which the said rolls are adapted to contact at one end of their range of movement.

Connected to the cam ring and to the driven member, are two coil springs 93, said coil springs being so arranged that their tendency is to rotate the cam ring and thereby bring the higher surfaces of the eccentric cams under the ends of the clutch dogs to thereby throw said dogs outwardly to force the clutch rolls against the flange of the driving member. On the clutch ring is mounted a light metal frame 94 having the substantially radial arms 95, Figs. 16 and 17. These arms are formed with stop fingers 96 which limit the movement of the clutch rolls in one direction and hold them in position on the clutch dogs 90.

In the operation of the device, when an envelop is between the controlling roll and the presser roll, a number, depending upon the length of the envelop, of controlling fingers will be turned backwardly until their notched ends are engaged by the locking dogs. This inward movement of the controlling fingers rotates the shafts or spindles carrying the tripping fingers bringing said fingers into position to engage the eccentric flange on the clutch-operating cam 73, said tripping fingers moving said cam outwardly and thereby rocking the shaft 74 and lifting the link 77. This link 77 brings the dog 78 upwardly and frees the lug 80 of the cam ring 81 and permits the springs 93 to move said cam ring and thereby lock the driven member of the clutch to the driving member thereof through the dogs 90 and the clutch rolls 91. The sleeve 88 will then revolve with the driving shaft until the two members of the clutch are disengaged.

The controlling fingers must be released from the locking dogs the instant the tripping fingers pass off the cam 73, in order that they will again project beyond the periphery of the controlling roll 57 and be in position to again engage an envelop should one be present between the controlling roll and the presser roll 60. In order to release the locking dog from the controlling fingers a stationary cam 97 is supported by a bracket 98, Fig. 10, in a position to be engaged by the pins 69 on the ends of the locking dogs, said cam being so shaped that the dogs will be released from the notches 66 of the controlling fingers 64 the instant the flanges 72 of the tripping fingers leave the flange 75 of the clutch operating cam. The instant the controlling fingers are released they will be moved to their outward position by the springs 70, said springs being connected to the fingers 64$^a$ and to adjoining locking dogs. As previously described, each shaft or spindle 65 carries one controlling finger 64$^a$ and on its opposite end one finger 64, the fingers 64 being notched to receive the locking dog while the fingers 64$^a$ are not notched. It is manifestly not necessary to lock both ends of the spindles 65. The cam 97 is arranged to release the locking dogs on one side of the controlling roll. To release the locking dogs on the opposite side of said roll, a cam 100 is rigidly mounted on an arm 101 which is secured to the machine frame and extends inwardly within the circle of the tripping fingers, as shown clearly in Fig. 10. The cam 100 is similar in form to the cam 97 and is correspondingly arranged to release the locking dogs the instant the tripping fingers leave the cam 73. It is to be understood that each spindle carries a tripping finger, as illustrated clearly in Figs. 9 and 12.

When the last tripping finger, which has been sprung outwardly to operative position, has passed the clutch-operating cam said cam moves downwardly and consequently moves the rock shaft 74, arm 76, link 77 and arm 78. This latter arm being then free to ride on the eccentric cam 102, Fig. 15, finally contacts with lug 80, forces said lug and clutch ring against the tension of the springs 93, thereby releasing the clutch dogs and the locking rolls. A yielding stop 80ª arrests the lug 80. The momentum carries the driven member of the clutch around until pawl 102ª at the rear of the machine engages in notch 102ᵇ in the driven member. This prevents the driven member from slacking back and together with dog 78 and lug 80 holds springs 93 in tension. It will thus be seen that the driven member of the clutch will be released from the driving member and that the sleeve 88 will remain stationary, thereby stopping the stamp feed, as will be more fully hereinafter set forth. The moment the dog 78 is again raised to release the lug 80, the two members of the clutch will be again thrown into engagement and the sleeve 88 and the parts carried thereby again operated.

The circumference of the controlling roll is greater than the longest envelop ordinarily used, so that some of the controlling fingers will always project beyond the periphery of the roll and be in position to engage an envelop passing between the controlling roll and the presser roll.

*Stamp feeding and affixing means.*—Below the controlling roll is arranged a conveying roll 103, on shaft 103ª, said roll being on the same side of the envelop path as the controlling roll. On the opposite side of the envelop path is pivoted a depending guide finger 104 mounted on a rock shaft 105, an arm 106 being connected to the rock shaft, Figs. 2 and 3. On the end of the arm 106 is connected a link 107 whose lower end is connected to a lever 108, said lever being pivoted at 109 and carrying an arm 110 whose lower end is provided with an antifriction roll 111 arranged to bear on a cam 112 carried by the clutch sleeve 88. The movement of this finger 104 is so timed as to hold an envelop against roll 103 until said envelop has passed below said roll and down to the sealing and stamping table 22. The finger will then move away from said roll to free the upper edge of the envelop should said envelop be long enough to extend from the sealing table to said finger. The movement of this finger 104 is timed to permit the envelops to pass into the sealer after the stamp affixing operation, and its operation is dependent upon the controlling means. It will therefore not be operated except when an envelop has passed between the controlling roll and its companion presser roll. This finger also serves as means to prevent the envelop coming in contact with and being moved by the sealer apron or belt.

After the envelop has passed the finger 104 it drops to the sealing and stamping table 22. At this point it is held in its upright position by the compression lever 170. Plate 114ª in which is journaled the lower ends of the rollers which carry the sealing belt forms also a guide plate, and the edge of said plate projects inwardly beyond the vertical surface of the sealing belt and normally holds the envelop away from said belt, see Fig. 2ª. As soon as the envelop reaches the stamping and sealing table the stamp is affixed thereto and the envelop then fed through the sealing means to the stacker.

The stamp feeding means consists of a stamp reel 115 mounted on a vertical pin 116 supported by the table 22, Figs. 4, 5, 6 and 7. This reel is formed with the bottom disk 117 which supports the roll of stamps and below said disk carries a grooved pulley 118. Pivoted on the pin 116 is a tension lever 119 which is formed with the lateral arm 120 at its inner end and carries the take-up roll 121 at its outer end. A tension spring 122 is connected at one of its ends to the arm 120 and at its other end to a rigid pin on the table 22. Connected to a rigid pin 123 carried by the table 22 is a brake cord or band 124. Said band encircles the grooved brake wheel 118 and is connected at its other end to the take-up lever 119, the spring 122 normally tending to so swing the take-up lever as to tighten the band on the brake wheel. The stamps are formed in a long strip perforated transversely between each stamp, said strip being wound on the stamp reel 115 and leading therefrom around the take-up roll and thence to the stamp feeding and affixing means. The tension of the spring 122 serves to keep the stamp strip under a slight tension; and the brake band serves to prevent the too-free rotation of the stamp reel. Should the stamp strip for any reason become loose it will permit the take-up lever to be moved sufficiently to apply the brake band. By providing the take-up roll 121 and the spring 122 for maintaining a constant light and uniform pressure on the stamp strip all danger of breaking it at the feeding mechanism will be avoided. By thus eliminating the slack between the feeding device and the reel all sudden strains on the strip will be avoided.

From the take-up reel the stamp strip passes into and through a tubular guide 125 mounted at a point close to the stamp affixing means. Near the exit end of the guide are mounted two stamp feeding rolls 126 and 126ª between which the stamp strip passes, as indicated clearly in Fig. 4. Roll 126 is mounted in a moistening box 127 and is kept moist by means of a wick 128 which is yieldingly pressed against said roll by a slide 129, said slide being actuated by a spring 130. Moistening fluid is delivered to the wick 128 by means of a funnel 131, said funnel being supplied from a drip pipe 132, which may receive water from the main tank 28 or any other suitable source of supply. An over-flow or surplusage from said tank escapes therefrom through drip pipe 132ª connected to the bottom of the tank, said drip pipe may lead to any desired point. The stamp strip is wound upon the reel in such a manner that its gum side will contact with the moistening roll 126. The lower ends of the shafts of the feeding rolls 126 and 126ᵃ pass through the table 22 and carry below said table intermeshing gears 133 and the shaft of roll 126ᵃ carries a ratchet wheel 134 rigidly secured thereto. Below said ratchet wheel and rotatably mounted on the shaft of the roll 126ᵃ is an arm 135 carrying a pawl 136 adapted to engage the teeth of the ratchet wheel. Connected to the arm and adapted to rotate therewith is a small gear 137.

Loosely secured to the frame of the machine is a slide 138, said slide being formed with a rack bar 139 adapted to engage the gear 137 and to thereby oscillate said gear and the arm 135 as the said slide is reciprocated. This slide is held to the side of the frame by means of screws 140, said screws passing through slots 141 in the slide. One end of said slide is operatively connected to the stamp feed lever 142, said lever being arranged in a horizontal position directly below the sealing and stamping table and pivoted at 143. On the under side of this lever is secured an anti-friction roll 144 which is adapted to ride in the groove of a cam 145, said groove being so arranged as to oscillate the lever 142. Carried by the lever above the sealing and stamping table 22 is a pair of jaws 146, each of said jaws being carried by an actuating arm 147, and one of said jaws being faced with yielding material 146ᵃ. These actuating arms 147 are connected together by means of a spring 148 and each carries at its end a roller 149. The tension of the spring 148 tends to throw the two jaws together. Carried by the stamp feed lever 142 is an oscillating cam 150, said cam being mounted on a pivot 151 and said pivot carrying an arm 152 at its lower end below the lever 142. At the end of the arm 152 is a roller 153 adapted to be engaged by the cam 154, as will be more fully hereinafter described. The oscillating cam 150 is formed with the two cam faces 155 which are adapted to engage the rollers 149 to separate the jaws 146 and the oscillating cam is adapted to be moved to release the rolls 149 and permit the jaws to close when the stamp feed lever 142 has completed its movement toward the stamp feed rolls and to remain in this closed position until the stamp feed lever has returned to its release position, as shown in Fig. 6. The cam 154 is arranged to contact with the roller 153 when the feed lever is at the limit of its movement toward the feed rolls. This will be readily understood from the construction of the cams 145 and 154 as shown in Fig. 3. To return the oscillating cam to its normal release position and to cause it to engage the rolls 149 for the purpose of opening the jaws 146 the cam 156 is provided, said cam being adapted to engage the roller 153 when the stamp feed lever is at the limit of its movement away from the feed rolls and has completed the feeding of the stamp strip. The cam 156 contacts with the roller 153 and swings the oscillating cam 150 in such a manner as to cause the cam faces 155 to engage the rollers 149 and thereby separate the arms 147, releasing the jaws from the stamp strip.

Cams 145 and 154 are rigidly secured to a sleeve 145ᵃ which is loosely mounted on sleeve 88. To lock these two sleeves together so that normally they rotate as one, a clutch 88ᵃ is provided, Fig. 27ᵃ. The two members of this clutch are normally engaged, but they may be disengaged so that the sleeve 88 may rotate without rotating the outer sleeve 145ᵃ by means of an operating handle 88ᵇ, as shown in Fig. 3. When the machine is used merely for sealing mail matter the two members of the clutch 88ᵃ will be disengaged, thereby permitting the sleeve 145ᵃ to remain stationary. On this sleeve are secured cams for operating the stamp feeding and affixing means. It will, therefore, be seen that by disengaging the clutch members said stamp feeding and affixing means will be rendered inoperative.

The operation of this portion of the invention may be briefly described as follows: The stamp strip is wound upon the stamp reel and its end is led around the take-up roll through the guide 125 and between the feed and moistening rolls 126 and 126ᵃ, the end of the strip being projected slightly beyond the feed roll. The moistening roll is kept in a moist condition through the moistening wick 128. When the stamp feed lever 142 is swung toward the feed rolls by the cam 145 the jaws 146 embrace the projecting end of the stamp strip, the rack 139 rotates the pinion 137 and the arm 135 causing the feed roll 126ᵃ to be rotated through the action of the pawl 136 and the ratchet wheel 134. By this means the stamp is fed outwardly into proper position to be engaged by the jaws 146. When the feed lever has reached the limit of its movement toward the feed rolls cam 154 engages the roller 153, oscillating cam 150 and releasing the arms 147, thereby permitting the spring 148 to close the jaws 146 on the stamp strip. The cam 145 now swings the stamp feed lever away from the stamp feed rolls thereby drawing outwardly the stamp strip. When the said lever has reached the limit of its movement away from the stamp feed rolls cam 156 will engage the roller 143, thereby oscillating the cam 150 and causing it to force outwardly the arms 147 thereby releasing the jaws 146.

To hold the lever 142 in position to release the stamp gripping jaws, a stop pin 157 is mounted on the lever beyond the pivot of the cam 150, said pin being adapted to be engaged by said cam when it is swung outwardly to its unlocked position by the cam 156. When said cam is in engagement with said pin the cam faces 155 thereof will engage the rollers 149 on the lever 147 and hold the stamp gripping jaws open. To prevent said cam swinging too far inwardly under the action of cam 154, a stop pin 157$^a$ is also mounted on the feed lever 142 on the opposite side of the cam 150 from the stop pin 157. This pin is adapted to be engaged by the cam 150 when it is swung inwardly by means of the cam 154, to its release position, that is to say when it is released from the stamp gripping levers to permit the stamp gripping jaws to close on the stamp strip. To prevent the stamp entering too far between the jaws 146, a gage 158 is provided. The purpose of this gage is to properly position the stamp for the stamp affixing means. It is necessary that the feed of the stamp feeding rolls shall be excessive so the edge of the stamp will surely contact with the gage 158 even if there is a considerable variation in the lengths of the individual stamps. Said gage will prevent the strip passing inwardly beyond the jaws. In this manner the free edge of the stamp strip will be drawn outwardly a predetermined distance from the feed rolls at each stroke of the stamp feeding means. This is important and it is necessary to the proper operation of stamp feeding means of this type that the free edge of the strip shall reach a predetermined point for each feeding movement. Thus the stamp strip is first fed out a portion of the length of a single stamp by rolls 126 and 126$^a$. It is then grasped by the jaws and pulled until the first perforation is slightly to the left of the edge of the moistening box, the ratchet connection allowing the rolls to rotate freely as the strip is pulled. The stamp is now moistened and in position to be engaged by the stamp affixing means and said means will now be described.

*Stamp affixing means.*—When the stamp strip or ribbon has been drawn out to the position shown in Fig. 4 and the stamp is ready to be affixed to the envelop a holding lever 159 mounted to oscillate freely on a rock shaft 160 is released by a cam 161 mounted on the sleeve 145$^a$, said sleeve as hereinbefore described normally rotates with the sleeve 88. Figs. 2$^a$, 3 and 23. The lever 159 is provided with the roller 162 which engages the cam 161. The upper end of the holding lever 159 is concave, as shown at 159$^a$, Fig. 4, to adapt it to engage the stamp feeding roll 126$^a$ and press the same against the stamp strip which is held between the said roll and roll 126. The movement of the stamp holding lever is very slight, as clearly shown by the shape of the cam in Fig. 23. The bearings of roll 126$^a$ are slightly slotted, Fig. 7$^a$, so that pressure thereon through the lever 159$^a$ will move it sufficiently to cause it to grip the stamp strip and prevent the same being drawn outwardly between the rolls during the affixing operation. A spring 163 is attached to lever 159 and holds the roller 162 against the actuating cam and causes said lever to engage feed roll 126$^a$ when said lever is permitted by its cam to move inwardly.

To clamp the envelop, or that portion thereof to which the stamp is to be affixed, firmly against the stamp during the affixing operation an envelop clamp lever 164 is provided, said lever being on the opposite side of the envelop path from the holding lever 159. To operate said lever a cam 165 is secured to sleeve 145$^a$. Lever 164 is also loosely mounted on rock shaft 160 and is provided with a roller 166 which bears on the operating cam 165. To this envelop clamp lever is secured the other end of spring 163, said spring serving to draw the lever into proper position when the roller 166 is engaged by the reduced portion of the cam 165.

To press the stamp to the envelop and to tear it from the stamp strip along the transverse line of perforations in said strip, a stamp affixing lever 167 is provided, said lever being on the same side of the stamp strip and the envelop path as the holding lever 159. This stamp affixing lever is also loosely mounted on the rock shaft 160 and is operated by means of a grooved stamp affixing cam 168. Lever 167 is provided with a roller 169 which fits the groove in cam 168, Fig. 24. This lever engages the projecting end of the stamp strip, forces the same to the envelop and then bodily forces the envelop and its clamp lever 164 outwardly sufficiently to tear the stamp from the stamp strip, the stamp strip being held against movement between the rolls 126 and 126$^a$ by the lever 159.

The stamp affixing lever 167 and the envelop clamp 164 draw the stamp strip against the cutting or shearing edge 127$^a$ of the moistener box, said edge serving to assist in tearing or cutting the stamp from the strip. This edge of the moistener box is also formed with rearwardly extending stripper fingers 127$^b$ which are adapted to enter the grooves in the stamp feeding roll 126 to strip the stamp therefrom and to prevent it adhering thereto. As soon as the affixing lever 167 has reached the limit of its movement, levers 159, 164 and the affixing lever are immediately returned to their normal positions by their respective cams.

*Sealing means.*—Immediately following the operation of feeding and affixing a stamp the envelop is engaged on its sealing side by a compressing lever 170, Figs. 3 and 8. This lever engages the envelop just under the flap and practically throughout the length of the envelop and forces it against the sealing belt 114. This lever presses the envelop close under the flap and allows the flap to be neatly folded down even though the envelop is excessively full. This lever is mounted on a vertical rock shaft 171, said rock shaft carrying at a point below the sealing and stamping table an arm 172 which is adapted to be engaged by a pressure cam 173. Said cam is rigidly secured to the sleeve 88, and normally holds lever 170 away from the sealing belt. The arm 172 is provided with a depending pin carrying a roller 174 which bears on the cam 173. To hold the roller in engagement with the cam the spring 175 is connected to another arm 176 also carried by the rock shaft 171. The pressure lever carries a vertically disposed pressure roll 177 which is adapted to bear against the envelop and over which the envelop moves to the sealing mechanism. To smooth or lay the flap down over the compressed envelop a spring-pressed flap folding plate 178 is pivoted on an adjoining portion of the frame of the machine on the same side of the envelop path as the pressure lever. As the envelops are carried forward into the sealing rolls by the sealing belt the flaps will be engaged by said folding plate and pressed against the envelop, and said plate is arranged close to the free end of the pressure lever which presses the envelop under the flap so that the flap will be pressed into engagement with the envelop close to the edge of said lever and as the envelops move forwardly or from said lever. By this means the flaps will be folded into engagement with the envelops while the envelops are in their compressed condition, thus insuring proper sealing thereof. After leaving the flap folding plate 178 the envelops are engaged by the sealing rolls 179, and 179$^a$ the sealing belt traveling around one of said rolls and a smaller roll 180, the said smaller roll being located adjacent to the end of the pressure lever 170, but on the opposite side of the envelop path from said lever. From the rolls 179 the envelops are delivered to rolls 181 and 181$^a$ and from these latter rolls they are delivered into the stack or magazine 182, the stacker plate 183 arresting the movement of the envelops. To properly arrange the envelops in the magazine or stack a stacking lever 184 is provided. Figs. 1, 3, 8 and 22. said lever being rigidly secured to the end of rock shaft 160. Rigidly secured to this rock shaft is a lever arm 185, said arm being provided with a roller 186 arranged to operate in a groove 187 of a cam disk 188. The cam 188 is rigidly mounted on sleeve 88 and the arm 185 is rigidly secured to the rock shaft 160. It will, therefore, be seen that the stacker lever will be operated from the sleeve 88 and is independent of the stamp feeding and affixing means.

On the stacker lever is secured a horizontal plate 189 which is adapted to engage the envelops as they are delivered from the rolls 181 and force them into the magazine or stacker, a suitable follower 190 being arranged within the stacker and against which the envelops are forced. To retain the envelops in position within the stacker, spring-pressed holding plates 191 are mounted in the stacker plate 183. said plates being so arranged that they will fold outwardly or away from the envelops as the envelops are moved into the stack and then will spring inwardly to engage the envelops and hold them in their rearward position, as shown clearly in Fig. 8. It will, therefore, be seen that the envelops in the stacker will be held under more or less pressure, thereby insuring a proper sealing of their flaps. The stacker plate 183 is adjusted to the right of rolls 181 a distance slightly less than the width of the envelops. As the envelop is pressed back against the stack, the rapidly revolving rear roll 181$^a$ helps to force it back and holds it there. The sealing roll 181 is driven through a beveled gear 195 carried by the main shaft 82, and which meshes with a small gear 196 secured to the lower end of the shaft of said roll. The upper end of the shaft of this roll carries a gear 197 which drives the gear 198 secured to the upper end of the shaft of sealing roll 179 through an idle gear 197$^a$. This part of the apparatus runs constantly, being driven directly from the main shaft.

The sealing rolls 179$^a$ and 181$^a$ are yieldably supported by means of pivotal arms 181$^b$ which are suitably supported in the frame. Spring pressed plungers 181$^c$ are mounted in tubes 181$^d$, said tubes containing springs which force the plungers outwardly and thereby yieldingly force the sealing rolls into the envelop path. The purpose of yieldingly mounting the sealing rolls is to permit of the passage of envelops of different thicknesses. Roll 181$^a$ is grooved circumferentially, and in said grooves fit spring fingers 192 which serve to strip from said roll the envelops and to prevent them passing around or following the roll. These fingers are carried by the side wall 193 of the stacker magazine.

The sealing mechanism described herein but not claimed forms the subject-matter of a divisional application filed May 20, 1911 and serially numbered 628,439,

Having thus fully described my invention, what I claim as new and desire to secure by Letters Patent is:

1. An envelop feeding means for a sealing and stamping machine comprising a magazine to hold a pile of envelops, means for moving the envelops through said magazine to the exit end thereof, feed rolls to receive the envelop from the magazine, a rotatable envelop holding device above the magazine and adapted to engage the upper edge of the foremost envelop to hold the envelops rearwardly inclined with respect to the exit end of the magazine, and means for adjusting the envelop holding device to adapt it for different sizes of envelops.

2. An envelop feeding means comprising a magazine to hold a stack of envelops, a separator roll adjacent the delivery end of said magazine, an escapement below the magazine and on the opposite side of the envelop path from the separator roll, a retaining roll adjacent the escapement and on the opposite side of the envelop path from the separator roll, and means for rotating the retaining roll in a direction to return the envelops toward the magazine.

3. An envelop feeding means comprising a magazine to hold a stack of envelops, feeding devices adjacent the delivery end of the magazine, a retaining means on the opposite side of the envelop path from the feeding devices, said retaining means tending to return the envelops to the magazine, and a reciprocating escapement to intermittently arrest the movement of the envelops and to permit the forwardmost envelop to pass.

4. An envelop feeding means comprising a magazine to hold a stack of envelops, a separator roll adjacent the delivery end of said magazine, yielding means for pressing the envelops against the separator roll, a retaining roll below the magazine and on the opposite side of the envelop path from the separator roll and adapted to rotate in the same direction as the separator roll, means for yieldingly supporting said retaining roll, a reciprocating escapement on the opposite side of the envelop path from the separator roll and adapted to extend across said path and to temporarily limit the movement of the envelops and to permit the forwardmost one to be moved by the separator roll.

5. An envelop sealing machine comprising means to hold a pile of envelops to be sealed, a feeding means, means for moistening the envelop flaps, means for accelerating the movement of the envelops after the flaps have been moistened, means for arresting the movement of the envelop after said acceleration, means for affixing a stamp thereto during said period of rest and means for sealing the flaps after the stamps are affixed.

6. An envelop sealing machine comprising means to hold a pile of envelops to be sealed, a feeding means, a flap moistening means, an eccelerated feeding means to move the envelop after it has passed the flap moistening means, means to arrest the envelop after its accelerated movement, a stamp affixing means adapted to operate during the period of dwell and a flap sealing means adapted to move the envelop from the stamp affixing means.

7. A sealing machine comprising means for holding a stack of envelops, means for feeding said envelops, one by one, means for moistening the flaps of said envelops, means for accelerating the movement of said envelops after their flaps are moistened, means for arresting the envelops after accelerated movement, means for affixing a stamp thereto during the rest or dwell of the envelop, a compressing device adapted to engage the envelop under the flap after the stamping operation and a sealing means adapted to grasp the flap edge of the envelop and draw it from the compressing device and press the flap thereto.

8. A sealing and stamping machine comprising means for feeding envelops, means for moistening the flaps thereof, means for accelerating the speed of the envelop after the flaps have been moistened, means for holding the envelops stationary at the end of said accelerated movement, a stamp feed controlling mechanism adapted to engage the passing envelop, a stamp affixing mechanism controlled thereby, whereby the stamp affixing mechanism will be rendered operative by a passing envelop and means for sealing the envelops after the stamp affixing operation.

9. An envelop stamping machine comprising means for feeding the envelops, a stamp feeding and affixing means, means for controlling the operation of said stamp feeding and affixing means comprising a series of fingers rotatably mounted within the path of the envelop and adapted to engage a passing envelop and to be operated thereby and means operated by said fingers to control the operation of the stamp feeding and affixing means.

10. An envelop stamping means comprising an envelop feeding means, a stamp feeding and affixing means, a series of fingers adapted to be moved into the path of the advancing envelop and to engage the face or side of said envelop to be thereby turned on their pivots and means operatively connecting said fingers with the stamp affixing means whereby said means will be operated whenever there is an envelop engaging the said fingers.

11. A machine for affixing stamps to envelops comprising an envelop feeding means, a stamp feeding and affixing means, a series of pivoted controller fingers carried by the feeding means and adapted to engage a passing envelop and to be thereby turned on their pivots, a clutch mechanism adapted to be operated by said fingers, and means for connecting said clutch mechanism to the stamp feeding and affixing mechanism, whereby said latter mechanism will be rendered operative by a passing envelop.

12. A machine for affixing stamps to envelops comprising an envelop feeding means, a stamp feeding and affixing means, a series of movable controller fingers carried by the feeding means and adapted to be moved on their pivots by contact with a passing envelop, and means operated by said fingers to connect and disconnect the stamp feeding and affixing means with the driving mechanism.

13. A stamp affixing machine comprising means for feeding envelops, a stamp feeding and affixing mechanism, driving mechanism therefor, a series of controller fingers operating in the path of the envelop and adapted to engage a passing envelop and to be operated thereby, a clutch mechanism between the stamp feeding and affixing means and the driving mechanism and means whereby said clutch will be connected and disconnected through the controller fingers.

14. An envelop stamping machine comprising an envelop feeding means, a stamp feeding and affixing means, a driving mechanism, means interposed between the driving mechanism and the stamp feeding and affixing means for connecting and disconnecting said mechanisms, a pivoted control device adapted to move across the path of the envelop and to engage the face or side of a passing envelop and to be thereby swung on its pivot, and means whereby said pivoted control device will operate the means for connecting and disconnecting the stamp feeding and affixing means to the driving mechanism.

15. An envelop stamping machine comprising an envelop feeding means, a stamp feeding and affixing means, a driving mechanism, a pivoted control device adapted to move across the path of the envelop and to engage the face or side of a passing envelop and to be thereby swung on its pivot, and means whereby said pivoted control device will connect and disconnect the stamp feeding and affixing means to the driving mechanism.

16. A stamp affixing machine comprising means for feeding envelops, means for feeding and affixing stamps, a driving mechanism, a movable controller device normally moving across the path of the envelops and adapted to engage the face or side of a passing envelop and to be moved by it, and means operated by said controller device to connect or disconnect the stamp feeding means to the driving mechanism.

17. A stamp affixing machine comprising means for feeding envelops, a driving mechanism, means for feeding and affixing stamps normally disconnected from the driving mechanism, a controller device normally moving across the path of the envelops and adapted to engage the side or face of a passing envelop and to be moved thereby, and means operated by said finger device to connect the driving mechanism to the stamp feeding and affixing means.

18. A stamp affixing machine comprising means for feeding envelops, a driving mechanism, means for feeding and affixing stamps normally disconnected from the driving mechanism, a rotatable controller device adapted to engage the side or face of a passing envelop and means operated by said controller to connect the driving mechanism to the stamp feeding and affixing means.

19. A stamp affixing machine comprising means for feeding envelops, a driving mechanism, means for feeding stamps normally disconnected from the driving mechanism, a rotatable controller adapted to move in the same direction as the envelop and adapted to engage the side of a passing envelop, and means operated by said device to connect the driving mechanism to the stamp feeding and affixing means.

20. A stamp affixing machine comprising means for feeding envelops, a driving mechanism, means for feeding and affixing stamps normally disconnected from the driving mechanism, a rotatable controller, a series of pivoted controller fingers normally projecting beyond the periphery of said controller and adapted to engage the flat face or side of a passing envelop and to be turned on their pivots thereby, and means operated by said fingers to connect and disconnect the stamp feeding means to the driving mechanism.

21. A stamp affixing machine comprising means for feeding envelops, a driving mechanism, means for feeding and affixing stamps normally disconnected from the driving mechanism, a roller adapted to engage the passing envelop to serve as a feed roller, a series of outwardly extending pivoted fingers carried by said roller, said fingers normally crossing the path of the envelop and being adapted to be swung on their pivots by contact therewith and means actuated by said fingers to connect and disconnect the driving mechanism to the stamp feeding and affixing means.

22. An envelop sealing and stamping machine comprising means for holding a pile of envelops, means for automatically feeding said envelops, means for moistening the envelop flaps, means for increasing the speed of the envelops after the flaps have been moistened, means to arrest the envelop at the end of its accelerated movement, means for feeding and affixing a stamp to the envelops after the flaps have been moistened and means adapted to engage the envelop during its accelerated movement to render the feeding and affixing means operative to affix a stamp at the end of the accelerated movement of the envelop, and means for sealing the envelop flap after the stamp affixing operation.

23. An envelop sealing and stamping machine comprising a support for a pile of envelops, means for feeding envelops therefrom, one by one, means for moistening the envelop flaps, means for giving the envelops an accelerated movement after the flaps are moistened, means for holding the envelop stationary at the end of said accelerated movement, a stamp affixing means adapted to operate during the dwell of the envelop and means dependent upon the passing envelop to actuate the stamp feeding and affixing means.

24. A machine for sealing and stamping envelops comprising a two-speed feeding means, means for moistening the flaps when the envelops are moving at the lower speed, means for arresting the envelop at the end of its high-speed movement, means for feeding and affixing a stamp to the envelope at the end of the high speed movement of the envelop and a sealing means operating on the envelop after the stamp is affixed.

25. A machine for stamping envelops comprising a two-speed feeding means adapted to automatically feed envelops, means to arrest the envelop at the end of its high speed movement and means for affixing a stamp to the envelop during the rest or dwell of the envelop at the end of its high speed movement.

26. A machine for stamping envelops comprising a support for a pile of envelops, a two-speed feeding means adapted to automatically feed envelops from said support, means to arrest the envelop at the end of its high speed movement, a stamp feeding and affixing means adapted to operate when the envelop is at the end of its high speed movement, means adapted to engage the envelop during its high speed movement and thereby render the stamp feeding and affixing means operative.

27. A machine for sealing and stamping envelops comprising a support for a pile of envelops, a two-speed feeding means adapted to automatically feed envelops from said support, a flap moistening means adapted to operate on said envelops during their slow speed movement, means to arrest the envelop at the end of its high-speed movement, a stamp affixing means adapted to operate on the envelop at the end of its high speed movement, means adapted to engage the envelop during its high speed movement to render the stamp feeding and affixing means operative and means for sealing the envelop after the stamping operation.

28. A machine for sealing and stamping envelops comprising a support for a pile of envelops, a two - speed feeding means adapted to automatically feed envelops from said support, a flap moistening means adapted to operate on each envelop during its slow speed movement, a stamp affixing means adapted to operate on the envelop at the end of its high speed movement, means adapted to engage the envelop during its high-speed movement to render the stamp feeding and affixing means operative, means for compressing the envelop and means for sealing the envelop flap after the envelop is compressed.

29. A machine for stamping envelops comprising a support for a pile of envelops, a driving mechanism, a series of feeding rolls to advance the envelop through the machine, a series of controller fingers pivoted on one of said feeding rolls and extending beyond the periphery thereof and normally moving across the path of the envelop to engage the flat face or side thereof, a normally inoperative stamp feeding and affixing means, a clutch for connecting said means to the driving mechanism and means operated by the controller fingers to control the movements of said clutch whereby the stamp feeding and affixing means will remain inoperative until an envelop is passed between the feeding rolls.

30. A stamping machine comprising a support for a pile of envelops, a series of rolls adapted to advance the envelop through the machine, a series of fingers pivoted on one of said feeding rolls and extending beyond the periphery thereof and normally moving across the path of the envelop, to engage the flat face or side thereof, a series of spring dogs to lock said fingers when they have been moved by contact with the passing envelop, means to release said dogs to permit them to return to their normal outwardly extending position, a series of cam fingers carried by the controller fingers, a cam lever adapted to be engaged by the said cam fingers, a clutch connected to said cam lever and a stamp feeding and affixing means controlled by said clutch.

31. An envelop feeding and stamping machine comprising a series of feed rolls, a series of pivoted radial fingers carried by one of said rolls and normally moving across the path of the envelop and adapted to engage the flat face or side thereof, a stamp feeding and affixing means and a clutch mechanism controlled by the movement of the said fingers and adapted to render the stamp feeding and affixing means operative.

32. An envelop feeding and stamping machine comprising a series of feed rolls, a series of movable devices carried by one of said rolls and normally extending across the path of the envelop and adapted to engage the flat face or side thereof, a normally inoperative stamp feeding and affixing means and means controlled by said movable devices to render the stamp feeding and affixing means operative.

33. A machine for feeding and stamping envelops comprising a series of feed rolls, a movable device carried by one of said rolls and extending across the path of the envelop and adapted to engage the flat face or side thereof, a normally inoperative stamp feeding and affixing means and means controlled by the movable device to render the stamp feeding and affixing means operative.

34. An envelop feeding means comprising a support for a pile of envelops, separator rolls to feed envelops from said support, a reciprocating escapement on the opposite side of the envelop path from the separator rolls and operating in conjunction with one of said separator rolls, and a retaining roll on the same side of the envelop path as the escapement and means for rotating said retaining roll in the same direction as the separator rolls.

35. An envelop feeding means comprising a support for a pile of envelops, separator rolls to feed envelops from said support, a reciprocating escapement on the opposite side of the envelop path from the separator rolls and operating in conjunction with one of said separator rolls, and a retaining roll on the same side of the envelop path as the escapement, means for rotating said retaining roll in the same direction as the separator rolls and a presser finger adapted to engage the envelop beyond the escapement and press it against the separator roll.

36. A machine for stamping envelops comprising a support for a pile of envelops, a series of separator rolls to separate the envelops, one by one, from the pile on the support, a series of feed rolls on opposite sides of the envelop path and adapted to engage said envelops, a series of controller fingers on one of said rolls, said fingers normally extending across the path of the envelop and adapted to engage the flat face or side of a passing envelop, a support for the envelop on the opposite side of the envelop path from the controller fingers and adapted to support the envelop while it is being engaged by the controller fingers, a stamp feeding and affixing means, and means operated through the controller fingers to govern the movement of said stamp feeding and affixing means.

37. A machine for feeding and stamping envelops comprising a support for a pile of envelops, separator rolls to receive the envelops from said support, a series of feed rolls to receive the envelops from the separator rolls and located on opposite sides of the envelop path, means for yieldably mounting some of said feed rolls, a series of controller fingers carried by one of said feed rolls normally moving across the path of the envelop and adapted to engage the flat face or side of a passing envelop, a support for the envelop yieldable with one of the yielding rolls and adapted to support the envelop when it is engaged by the controller fingers, and a stamp feeding and affixing means, and means operated by the controller fingers to render said feeding and affixing means operative.

38. A stamp affixing machine comprising means for feeding envelops, one by one, a driving mechanism, means for feeding and affixing stamps, said means being normally disconnected from the driving mechanism, a roller adapted to engage the passing envelop and to serve as a feed roll, the circumference of said roll being greater than the length of the longest envelop for which the machine is designed, a series of outwardly extending pivoted fingers carried by said roller, said fingers normally crossing the path of the envelop and being adapted to be swung on their pivots by contact therewith and being so arranged that some of said fingers will always project beyond the periphery of the roller, means actuated by said fingers to connect and disconnect the driving mechanism to the stamp feeding and affixing means and means to return the said fingers to their normal outwardly extending position after the passage of the envelop.

39. A stamp affixing means comprising means for feeding envelops, a driving mechanism, means for feeding and affixing stamps, said means being normally disconnected from the driving mechanism, a roller adapted to engage the passing envelops and to serve as a feed roll, a series of outwardly extending pivoted fingers carried by said roller, said fingers normally crossing the path of the envelop and being adapted to be swung on their pivots by contact with the flat face or side thereof, spring locking dogs pivoted on the roller and adapted to engage the fingers, and lock them in their inwardly turned position, cam fingers connected to and moved by the controller fingers, a rocking cam adapted to be engaged by said cam fingers, a clutch device operatively connected to said rocking cam and serving to connect and disconnect the stamp feeding and affixing means to the driving mechanism and a cam adapted to release the locking dogs from the controller fingers as the cam fingers are disengaged from the rocking cam.

40. A machine for stamping envelops comprising means for feeding envelops, one by one, a stamp strip holding reel, a pair of stamp feeding rolls, means for moistening the gummed side of the stamp strip, means for gripping the end of the stamp strip and drawing said strip from the feed rolls a predetermined distance and then releasing the same, an envelop supporting means, a stamp affixing means adapted to force the stamp against the envelop and the envelop against its supporting means, and means for gripping the stamp strip during the stamp affixing operation whereby the affixed stamp will be torn from the stamp strip.

41. A machine for stamping envelops comprising means for feeding envelops, one by one, a stamp strip holding means, a pair of feed rolls for said strip, means for moistening the gummed side of the stamp strip, means for actuating the stamp strip feed rolls intermittently to project the stamp strip beyond said rolls, a reciprocating gripping device to grip the projected end of the stamp strip and draw it from the feed rolls a predetermined distance and then release same, an envelop supporting means, a stamp affixing means adapted to force the stamp against the envelop and the envelop against its supporting means and means for gripping the stamp strip during the affixing operation whereby the affixed stamp will be torn from the stamp strip.

42. A machine for stamping envelops comprising means for feeding envelops, a stamp strip holding reel, a pair of stamp strip feeding rolls, means for moistening one of said rolls, means for intermittently actuating said rolls to feed the stamp strip, means for gripping the projected end of said strip and drawing it from said rolls a predetermined distance and then releasing it and means for affixing the stamp to an envelop.

43. A machine for stamping envelops comprising means for feeding envelops, a stamp strip holding reel, a pair of stamp strip feeding rolls, means for moistening one of said rolls, reciprocating means for intermittently rotating said feed rolls, reciprocating means for gripping the projected end of the stamp strip and drawing it from the feed rolls a predetermined distance and then releasing it, a gage carried by said reciprocating means to limit the length of the stamp strip drawn from the feed rolls by said reciprocating means, and stamp affixing means.

44. A machine for stamping envelops comprising means for feeding envelops, a stamp strip holding means, a pair of stamp strip feeding rolls, means for rotating the feeding rolls, a pair of reciprocating jaws adapted to grip the end of the stamp strip and draw it from the rolls a predetermined distance, a gage carried by said jaws to limit the entrance of the strip between said jaws, means for releasing said jaws when they have drawn the strip from the rolls a predetermined distance, and a stamp affixing mechanism.

45. A machine for stamping envelops comprising means for feeding envelops, a stamp strip holding reel, a pair of stamp strip feeding rolls, means for moistening one of said rolls, means for intermittently rotating said rolls, a reciprocating feed lever, a pair of jaws carried thereby, means for closing said jaws when they are advanced to receive the strip, means for opening said jaws when the strip has been drawn a predetermined distance from the feed rolls, and means for affixing the stamp and tearing it from the stamp strip.

46. A machine for stamping envelops comprising means for feeding envelops, a stamp strip holding reel, an intermittently operating stamp strip feeding means, a tension means adapted to engage the stamp strip between the reel and the feeding means, a brake device operating on the reel and controlled by the tension means, and a stamp affixing means.

47. A machine for stamping envelops comprising a stamp strip holding reel, an intermittently operating stamp strip feeding means, a stamp affixing means, a tension means adapted to engage the stamp strip between the reel and the feeding means and a brake device for the stamp reel and controlled by the tension means.

48. A machine for stamping envelops comprising a stamp strip holding reel, a pair of stamp strip feeding rolls, means for intermittently rotating said rolls, a reciprocating feeding means to grip the end of the stamp strip and draw it from said rolls a predetermined distance and then release the same and a yielding tension device engaging the stamp strip between the reel and the feed rolls.

49. A machine for stamping envelops comprising a stamp strip holding reel, a pair of stamp strip feeding rolls, means for intermittently rotating said rolls, a reciprocating feeding means to grip the end of the stamp strip and draw it from said rolls a predetermined distance and then release the same, a yielding tension device engaging the stamp strip between the reel and the feed rolls and a brake device engaging the stamp reel and controlled by the tension means.

50. A machine for stamping envelops comprising means for feeding envelops, means for holding a stamp strip, means for moistening said strip, means for feeding said strip a predetermined distance beyond the moistening means, an envelop clamp for supporting the envelop in position to receive a stamp, a stamp affixing jaw adapted to engage the stamp and press it against the envelop, a device to separate the affixed stamp from the strip and means to clamp the stamp strip during the affixing operation.

51. A machine for stamping envelops comprising means for feeding envelops, a stamp strip holding means, a pair of feed rolls, means for moistening one of said rolls, means for intermittently operating said rolls to feed the stamp strip a short distance, a reciprocating gripping device to grip the end of the stamp strip and draw it a predetermined distance from the feed rolls, means for causing the feed rolls to grip the stamp strip to prevent further feeding thereof, an envelop clamp, a stamp affixing device adapted to force the stamp to the envelop, and a device adapted to tear the stamp from the strip during the affixing operation.

52. A machine for sealing and stamping envelops comprising a support for a pile of envelops, means for feeding said envelops downwardly from said support, means for moistening the envelop flaps during their downward movement, means for arresting the downward movement of the envelops, means for affixing stamps thereto at the end of their downward movement, means for compressing said envelops under the flaps during the stamp affixing operation, means for moving said envelops horizontally and edgewise away from said compressing means, means for sealing the envelop flaps, a magazine to receive the envelops from the sealer and a vibrating stacker device adapted to engage the stamped face of the envelop and force it rearwardly into the magazine.

53. A machine for stamping envelops comprising means for feeding envelops, a stamp strip holding means, means for feeding said strip, means for moistening the gummed side of the stamp strip, a reciprocating envelop clamp, a reciprocating stamp affixing device adapted to force the stamp against the envelop and thereby tear it from the stamp strip, and means for holding the stamp strip against longitudinal movement during the stamp affixing operation.

54. A machine for stamping envelops comprising means for feeding envelops, a stamp strip holding reel, a pair of stamp strip feeding rolls, means for moistening one of said rolls, means for intermittently rotating said rolls, means for gripping the end of the stamp strip and drawing it from the feed rolls a predetermined distance and then releasing it, a clamp to hold the stamp strip against longitudinal movement, a reciprocating clamp to hold the envelop in position to receive the stamp, and a reciprocating stamp affixing device adapted to engage the stamp and force it against the envelop and to thereby tear the stamp from the strip.

55. An envelop sealing and stamping machine comprising a magazine, means for intermittently moving envelops from said magazine, a flap moistening means, means for accelerating the speed of said envelops after the flap moistening operation, whereby the released envelop is moved rapidly away from the next succeeding envelop.

56. An envelop sealing and stamping machine comprising a support for a pile of envelops, an intermittently operating feeding means to feed envelops, one by one from said support, a flap moistening means, means for accelerating the speed of the envelops after the flap moistening operation, and a sealing means adapted to engage the envelop at end of its accelerated movement and to move it at right angles to its previous path for the sealing operation.

57. A machine for sealing and stamping envelops comprising a support for a pile of envelops, an intermittently operating feeding means to feed said envelops one by one from said support, a flap moistening means, means for accelerating the speed of the envelops after the flap moistening operation, means to arrest the envelop at the end of its accelerated movement, means to affix a stamp to the envelop during its dwell at the end of its accelerated movement, and a sealing means adapted to engage the envelop after the stamp affixing operation and to move it at right angles to its previous path for the sealing operation.

58. An envelop sealing and stamping machine comprising a support for a pile of envelops, an intermittently operating escapement, a two-speed feeding means, a stamp affixing means, means controlled by the passing envelop for throwing in operation the stamp affixing means, and a sealing means engaging the envelop after the stamp affixing operation.

59. A sealing and stamping machine comprising a two-speed feeding means, a stamp affixing means, means controlled by the passing envelop to throw the stamp affixing means into operation, a sealing means engaging the envelop after the stamp affixing operation and adapted to move it at an angle to its previous path for the sealing operation.

60. A sealing and stamping machine provided with means for moving the envelop vertically for the flap moistening and stamp affixing operations, and means for moving it horizontally for the sealing operation.

61. A machine for stamping envelops comprising means for feeding envelops one by one, a stamp strip holding means, a reciprocating feeding means to grip the end of the stamp strip and move it a predetermined distance and then release the same, means for holding the envelop, a reciprocating stamp affixing jaw adapted to engage the end of the stamp strip and to affix a stamp to an envelop, said jaw also serving as means to tear the stamp from the strip, and means for holding the stamp strip against longitudinal movement during the operation of detaching the end stamp of the strip and affixing it to the envelop.

In testimony whereof I hereunto affix my signature in the presence of two witnesses this 7th day of February, 1910.

LOUIS J. HALL.

Witnesses:
WM. R. DAVIS,
F. R. MILLER.

Copies of this patent may be obtained for five cents each, by addressing the "Commissioner of Patents, Washington, D. C."